(12) United States Patent
Lu et al.

(10) Patent No.: US 12,435,153 B2
(45) Date of Patent: Oct. 7, 2025

(54) ANTIBODY TARGETING B CELL MATURATION ANTIGEN AND RELATED PRODUCTS THEREOF AND MEDICAL APPLICATIONS

(71) Applicant: Beijing Gene MINK Biotechnology CO.LTD, Beijing (CN)

(72) Inventors: Zhihua Lu, Beijing (CN); Yongfeng Liu, Beijing (CN)

(73) Assignee: Beijing Gene MiNK Biotechnology CO.LTD, Beijing (CN)

( * ) Notice: Subject to any disclaimer, the term of this patent is extended or adjusted under 35 U.S.C. 154(b) by 0 days.

(21) Appl. No.: 18/901,182

(22) Filed: Sep. 30, 2024

(65) Prior Publication Data
US 2025/0115674 A1 Apr. 10, 2025

(30) Foreign Application Priority Data
Oct. 8, 2023 (CN) .......................... 202311289005.6

(51) Int. Cl.
*A61K 39/395* (2006.01)
*A61K 40/15* (2025.01)
*A61K 40/31* (2025.01)
*A61K 40/42* (2025.01)
*C07K 14/705* (2006.01)
*C07K 16/28* (2006.01)
*C12N 5/0783* (2010.01)
*G01N 33/68* (2006.01)

(52) U.S. Cl.
CPC .......... *C07K 16/2878* (2013.01); *A61K 40/15* (2025.01); *A61K 40/31* (2025.01); *A61K 40/4202* (2025.01); *C07K 14/70517* (2013.01); *C07K 14/70578* (2013.01); *C12N 5/0636* (2013.01); *G01N 33/6854* (2013.01); *C07K 2317/24* (2013.01); *C07K 2317/92* (2013.01); *C07K 2319/02* (2013.01); *C07K 2319/03* (2013.01); *C12N 2510/00* (2013.01); *G01N 2333/70578* (2013.01)

(58) Field of Classification Search
None
See application file for complete search history.

(56) References Cited

FOREIGN PATENT DOCUMENTS

| | | |
|---|---|---|
| CN | 113784733 A | 12/2021 |
| CN | 114853892 A | 8/2022 |
| CN | 114891108 A | 8/2022 |
| CN | 115960240 A | 4/2023 |
| JP | 2020141680 A | 9/2020 |
| WO | 2022152151 A1 | 7/2022 |

*Primary Examiner* — Claire Kaufman
(74) *Attorney, Agent, or Firm* — Hawaii Patent Services; Nathaniel K. Fedde; Kenton N. Fedde

(57) ABSTRACT

The present disclosure belongs to the fields of biotechnology and biological medicine, and specifically relates to an antibody targeting a B cell maturation antigen (BCMA) and related products thereof and medical applications. Specifically, the antibody contains a variable light chain and a variable heavy chain. The variable light chain contains a light chain complementarity-determining region (CDR) 1, a light chain CDR2, and a light chain CDR3. The light chain CDR1 has a sequence as shown in SEQ ID NO. 1, the light chain CDR2 has an amino acid sequence as shown in SEQ ID NO. 2, and the light chain CDR3 is as shown in SEQ ID NO. 3 or SEQ ID NO. 4.

18 Claims, 25 Drawing Sheets
Specification includes a Sequence Listing.

SEQUENCE LISTING

```
Sequence total quantity: 48
SEQ ID NO: 1            moltype = AA  length = 11
FEATURE                 Location/Qualifiers
source                  1..11
                        mol_type = protein
                        organism = synthetic construct
SEQUENCE: 1
KASQNVGTNV A                                                                    11

SEQ ID NO: 2            moltype = AA  length = 7
FEATURE                 Location/Qualifiers
source                  1..7
                        mol_type = protein
                        organism = synthetic construct
SEQUENCE: 2
SASYRYS                                                                          7

SEQ ID NO: 3            moltype = AA  length = 8
FEATURE                 Location/Qualifiers
source                  1..8
                        mol_type = protein
                        organism = synthetic construct
SEQUENCE: 3
QQYNSYYT                                                                         8

SEQ ID NO: 4            moltype = AA  length = 8
FEATURE                 Location/Qualifiers
source                  1..8
                        mol_type = protein
                        organism = synthetic construct
SEQUENCE: 4
QQYSSYYT                                                                         8

SEQ ID NO: 5            moltype = AA  length = 10
FEATURE                 Location/Qualifiers
source                  1..10
                        mol_type = protein
                        organism = synthetic construct
SEQUENCE: 5
GYTFTNYVMH                                                                      10

SEQ ID NO: 6            moltype = AA  length = 17
FEATURE                 Location/Qualifiers
source                  1..17
                        mol_type = protein
                        organism = synthetic construct
SEQUENCE: 6
YILPYNDLTK YNEKFKG                                                              17

SEQ ID NO: 7            moltype = AA  length = 10
FEATURE                 Location/Qualifiers
source                  1..10
                        mol_type = protein
                        organism = synthetic construct
SEQUENCE: 7
HDYDGGVMDY                                                                      10

SEQ ID NO: 8            moltype = AA  length = 10
FEATURE                 Location/Qualifiers
source                  1..10
                        mol_type = protein
                        organism = synthetic construct
```

| | | |
|---|---|---|
| SEQUENCE: 8 | | |
| HDYDAGVMDY | | 10 |
| | | |
| SEQ ID NO: 9 | moltype = AA  length = 23 | |
| FEATURE | Location/Qualifiers | |
| source | 1..23 | |
| | mol_type = protein | |
| | organism = synthetic construct | |
| SEQUENCE: 9 | | |
| DIVLTQSQKF MSTSVGDRVS VTC | | 23 |
| | | |
| SEQ ID NO: 10 | moltype = AA  length = 23 | |
| FEATURE | Location/Qualifiers | |
| source | 1..23 | |
| | mol_type = protein | |
| | organism = synthetic construct | |
| SEQUENCE: 10 | | |
| DIQLTQSPST LSASVGDRVT ITC | | 23 |
| | | |
| SEQ ID NO: 11 | moltype = AA  length = 15 | |
| FEATURE | Location/Qualifiers | |
| source | 1..15 | |
| | mol_type = protein | |
| | organism = synthetic construct | |
| SEQUENCE: 11 | | |
| WYQQKPGQSP KALIY | | 15 |
| | | |
| SEQ ID NO: 12 | moltype = AA  length = 15 | |
| FEATURE | Location/Qualifiers | |
| source | 1..15 | |
| | mol_type = protein | |
| | organism = synthetic construct | |
| SEQUENCE: 12 | | |
| WYQQKPGKAP KALIY | | 15 |
| | | |
| SEQ ID NO: 13 | moltype = AA  length = 32 | |
| FEATURE | Location/Qualifiers | |
| source | 1..32 | |
| | mol_type = protein | |
| | organism = synthetic construct | |
| SEQUENCE: 13 | | |
| GVPDRFTGSG SGTDFTLTIS NVQSEDLAEY FC | | 32 |
| | | |
| SEQ ID NO: 14 | moltype = AA  length = 32 | |
| FEATURE | Location/Qualifiers | |
| source | 1..32 | |
| | mol_type = protein | |
| | organism = synthetic construct | |
| SEQUENCE: 14 | | |
| GVPSRFSGSG SGTEFTLTIS SLQPDDFATY YC | | 32 |
| | | |
| SEQ ID NO: 15 | moltype = AA  length = 12 | |
| FEATURE | Location/Qualifiers | |
| source | 1..12 | |
| | mol_type = protein | |
| | organism = synthetic construct | |
| SEQUENCE: 15 | | |
| FGGGTKLELK RT | | 12 |
| | | |
| SEQ ID NO: 16 | moltype = AA  length = 12 | |
| FEATURE | Location/Qualifiers | |
| source | 1..12 | |
| | mol_type = protein | |
| | organism = synthetic construct | |
| SEQUENCE: 16 | | |
| FGQGTRLEIK GG | | 12 |
| | | |
| SEQ ID NO: 17 | moltype = AA  length = 25 | |
| FEATURE | Location/Qualifiers | |
| source | 1..25 | |
| | mol_type = protein | |
| | organism = synthetic construct | |
| SEQUENCE: 17 | | |
| EVQLQQSGPE LVKPGASVKM SCKAS | | 25 |
| | | |
| SEQ ID NO: 18 | moltype = AA  length = 25 | |
| FEATURE | Location/Qualifiers | |
| source | 1..25 | |
| | mol_type = protein | |

```
                                 organism = synthetic construct
SEQUENCE: 18
QVQLVQSGAE VKKPGASVKV SCKAS                                              25

SEQ ID NO: 19           moltype = AA   length = 14
FEATURE                 Location/Qualifiers
source                  1..14
                        mol_type = protein
                        organism = synthetic construct
SEQUENCE: 19
WVKQKPGQGL EWIG                                                          14

SEQ ID NO: 20           moltype = AA   length = 14
FEATURE                 Location/Qualifiers
source                  1..14
                        mol_type = protein
                        organism = synthetic construct
SEQUENCE: 20
WVRQAPGQGL EWIG                                                          14

SEQ ID NO: 21           moltype = AA   length = 14
FEATURE                 Location/Qualifiers
source                  1..14
                        mol_type = protein
                        organism = synthetic construct
SEQUENCE: 21
WVRQAPGQGL EWMG                                                          14

SEQ ID NO: 22           moltype = AA   length = 32
FEATURE                 Location/Qualifiers
source                  1..32
                        mol_type = protein
                        organism = synthetic construct
SEQUENCE: 22
KATLSSDRSS STAYMELSSL TSEDSAVYYC AR                                      32

SEQ ID NO: 23           moltype = AA   length = 14
FEATURE                 Location/Qualifiers
source                  1..14
                        mol_type = protein
                        organism = synthetic construct
SEQUENCE: 23
WVRQAPGQGL EWIG                                                          14

SEQ ID NO: 24           moltype = AA   length = 32
FEATURE                 Location/Qualifiers
source                  1..32
                        mol_type = protein
                        organism = synthetic construct
SEQUENCE: 24
RVTLTSDRST STVYMELSSL RSEDTAVYYC AR                                      32

SEQ ID NO: 25           moltype = AA   length = 11
FEATURE                 Location/Qualifiers
source                  1..11
                        mol_type = protein
                        organism = synthetic construct
SEQUENCE: 25
WGQGTSVTVS S                                                             11

SEQ ID NO: 26           moltype = AA   length = 11
FEATURE                 Location/Qualifiers
source                  1..11
                        mol_type = protein
                        organism = synthetic construct
SEQUENCE: 26
WGQGTTVTVS S                                                             11

SEQ ID NO: 27           moltype = AA   length = 242
FEATURE                 Location/Qualifiers
source                  1..242
                        mol_type = protein
                        organism = synthetic construct
SEQUENCE: 27
DIVLTQSQKF MSTSVGDRVS VTCKASQNVG TNVAWYQQKP GQSPKALIYS ASYRYSGVPD         60
RFTGSGSGTD FTLTISNVQS EDLAEYFCQQ YNSYYTFGGG TKLELKRTGG GGSGGGGSGG         120
GGSEVQLQQS GPELVKPGAS VKMSCKASGY TFTNYVMHWV KQKPGQGLEW IGYILPYNDL         180
TKYNEKFKGK ATLSSDRSSS TAYMELSSLT SEDSAVYYCA RHDYDGGVMD YWGQGTSVTV         240
SS                                                                       242
```

```
SEQ ID NO: 28            moltype = AA  length = 242
FEATURE                  Location/Qualifiers
source                   1..242
                         mol_type = protein
                         organism = synthetic construct
SEQUENCE: 28
DIVLTQSQKF MSTSVGDRVS VTCKASQNVG TNVAWYQQKP GQSPKALIYS ASYRYSGVPD   60
RFTGSGSGTD FTLTISNVQS EDLAEYFCQQ YNSYYTFGGG TKLELKRTGG GGSGGGGSGG  120
GGSEVQLQQS GPELVKPGAS VKMSCKASGY TFTNYVMHWV KQKPGQGLEW IGYILPYNDL  180
TKYNEKFKGK ATLSSDRSSS TAYMELSSLT SEDSAVYYCA RHDYDGGVMD YWGQGTSVTV  240
SS                                                                242

SEQ ID NO: 29            moltype = AA  length = 240
FEATURE                  Location/Qualifiers
source                   1..240
                         mol_type = protein
                         organism = synthetic construct
SEQUENCE: 29
DIQLTQSPST LSASVGDRVT ITCKASQNVG TNVAWYQQKP GQSPKALIYS ASYRYSGVPS   60
RFSGSGSGTE FTLTISSLQP DDFATYYCQQ YNSYYTFGQG TRLEIKGGGG SGGGGSGGGG  120
SQVQLVQSGA EVKKPGASVK VSCKASGYTF TNYVMHWVRQ APGQGLEWIG YILPYNDLTK  180
YNEKFKGRAT LTSDRSTSTA YMELSSLRSE DTAVYYCARH DYDGGVMDYW GQGTTVTVSS  240

SEQ ID NO: 30            moltype = AA  length = 240
FEATURE                  Location/Qualifiers
source                   1..240
                         mol_type = protein
                         organism = synthetic construct
SEQUENCE: 30
DIQLTQSPST LSASVGDRVT ITCKASQNVG TNVAWYQQKP GQSPKALIYS ASYRYSGVPS   60
RFSGSGSGTE FTLTISSLQP DDFATYYCQQ YSSYYTFGQG TRLEIKGGGG SGGGGSGGGG  120
SQVQLVQSGA EVKKPGASVK VSCKASGYTF TNYVMHWVRQ APGQGLEWIG YILPYNDLTK  180
YNEKFKGRAT LTSDRSTSTA YMELSSLRSE DTAVYYCARH DYDGGVMDYW GQGTTVTVSS  240

SEQ ID NO: 31            moltype = AA  length = 240
FEATURE                  Location/Qualifiers
source                   1..240
                         mol_type = protein
                         organism = synthetic construct
SEQUENCE: 31
DIQLTQSPST LSASVGDRVT ITCKASQNVG TNVAWYQQKP GQSPKALIYS ASYRYSGVPS   60
RFSGSGSGTE FTLTISSLQP DDFATYYCQQ YNSYYTFGQG TRLEIKGGGG SGGGGSGGGG  120
SQVQLVQSGA EVKKPGASVK VSCKASGYTF TNYVMHWVRQ APGQGLEWIG YILPYNDLTK  180
YNEKFKGRAT LTSDRSTSTA YMELSSLRSE DTAVYYCARH DYDAGVMDYW GQGTTVTVSS  240

SEQ ID NO: 32            moltype = AA  length = 240
FEATURE                  Location/Qualifiers
source                   1..240
                         mol_type = protein
                         organism = synthetic construct
SEQUENCE: 32
DIQLTQSPST LSASVGDRVT ITCKASQNVG TNVAWYQQKP GQSPKALIYS ASYRYSGVPS   60
RFSGSGSGTE FTLTISSLQP DDFATYYCQQ YSSYYTFGQG TRLEIKGGGG SGGGGSGGGG  120
SQVQLVQSGA EVKKPGASVK VSCKASGYTF TNYVMHWVRQ APGQGLEWIG YILPYNDLTK  180
YNEKFKGRAT LTSDRSTSTA YMELSSLRSE DTAVYYCARH DYDAGVMDYW GQGTTVTVSS  240

SEQ ID NO: 33            moltype = AA  length = 240
FEATURE                  Location/Qualifiers
source                   1..240
                         mol_type = protein
                         organism = synthetic construct
SEQUENCE: 33
DIQLTQSPST LSASVGDRVT ITCKASQNVG TNVAWYQQKP GKAPKALIYS ASYRYSGVPS   60
RFSGSGSGTE FTLTISSLQP DDFATYYCQQ YSSYYTFGQG TRLEIKGGGG SGGGGSGGGG  120
SQVQLVQSGA EVKKPGASVK VSCKASGYTF TNYVMHWVRQ APGQGLEWMG YILPYNDLTK  180
YNEKFKGRVT LTSDRSTSTV YMELSSLRSE DTAVYYCARH DYDGGVMDYW GQGTTVTVSS  240

SEQ ID NO: 34            moltype = AA  length = 240
FEATURE                  Location/Qualifiers
source                   1..240
                         mol_type = protein
                         organism = synthetic construct
SEQUENCE: 34
DIQLTQSPST LSASVGDRVT ITCKASQNVG TNVAWYQQKP GKAPKALIYS ASYRYSGVPS   60
RFSGSGSGTE FTLTISSLQP DDFATYYCQQ YNSYYTFGQG TRLEIKGGGG SGGGGSGGGG  120
SQVQLVQSGA EVKKPGASVK VSCKASGYTF TNYVMHWVRQ APGQGLEWMG YILPYNDLTK  180
YNEKFKGRVT LTSDRSTSTV YMELSSLRSE DTAVYYCARH DYDAGVMDYW GQGTTVTVSS  240
```

```
SEQ ID NO: 35              moltype = AA  length = 240
FEATURE                    Location/Qualifiers
source                     1..240
                           mol_type = protein
                           organism = synthetic construct
SEQUENCE: 35
DIQLTQSPST LSASVGDRVT ITCKASQNVG TNVAWYQQKP GKAPKALIYS ASYRYSGVPS   60
RFSGSGSGTE FTLTISSLQP DDFATYYCQQ YSSYYTFGQG TRLEIKGGGG SGGGGSGGGG  120
SQVQLVQSGA EVKKPGASVK VSCKASGYTF TNYVMHWVRQ APGQGLEWMG YILPYNDLTK  180
YNEKFKGRVT LTSDRSTSTV YMELSSLRSE DTAVYYCARH DYDAGVMDYW GQGTTVTVSS  240

SEQ ID NO: 36              moltype = DNA  length = 726
FEATURE                    Location/Qualifiers
source                     1..726
                           mol_type = other DNA
                           organism = synthetic construct
SEQUENCE: 36
gacattgtgc tgacccaatc tcaaaaattc atgtccacat cagtaggaga cagggtcagc   60
gtcacctgca aggccagtca gaatgtgggt actaatgtag cctggtatca acagaaacca  120
gggcaatctc ctaaagcact gatttactcg gcatcctacc ggtacagtgg agtccctgat  180
cgcttcacag gcagtggatc tgggacagat ttcactctca ccatcagcaa tgtgcagtct  240
gaagacttgg cagaatattt ctgtcagcaa tataacgtt attacgtt cggaggggg   300
accaagctgg agctgaaacg tacgggtggt ggcggctcgg gcggcggcgg gtcgggagga  360
ggaggatccg aggtccagct gcaacaatct ggacctgagc tggtaaagcc tggggcttca  420
gtgaagatgt cctgcaaggc ttctggatac acattcacta ctatgttat gcactgggtg  480
aagcagaagc ctgggcaggg ccttgagtgg attggatata ttcttcctta caatgatctt  540
actaagtaca atgagaaatt caaaggcaag gccacactgt cttcagacag atcctccagc  600
acagcctaca tggagctcag cagcctgacc tctgaggact ctgcggtcta ttactgtgca  660
agacatgatt acgacggagg tgttatggac tactggggtc aaggaacctc agtcacagtc  720
tcctca                                                            726

SEQ ID NO: 37              moltype = DNA  length = 726
FEATURE                    Location/Qualifiers
source                     1..726
                           mol_type = other DNA
                           organism = synthetic construct
SEQUENCE: 37
gacatcgtgc tgacccagag ccagaagttc atgtccacca gcgtgggcga cagagtgagc   60
gtgacctgta aggccagcca gaacgtgggc acaaacgtgg cctggtatca acagaagccc  120
ggccagagcc ctaaggccct gatctacagc gccagctaca gatactccgg cgtgcctgat  180
agattcaccg gcagcggcag cggcaccgac ttcaccctga ccatcagcaa cgtgcagtcc  240
gaggatctgc ccgagtactt tgtcagcag tacaactcct actacacatt cggcggcggc  300
accaagctgg agctgaagag gaccggcggc ggcggaagcg gaggaggagg atctgcggc  360
ggcggttccg aggtgcagct gcaacagagc ggccctgagc tggtgaagcc cggcgctagc  420
gtgaagatga gctgcaaggc ctccggctac acattcacta ctacgtgat gcactgggtg  480
aagcagaagc ctgggccaggg cctggagtgg atcggctaca tcctgcctta caacgatctg  540
acaaagtaca acgagaagtt taagggcaag gccacactgt cctccgacag atcctcctcc  600
accgcctaca tggagctgtc ctccctgaca agcgaggact ccgccgtgta ctactgcgcg  660
aggcacgact acgacggcgg cgtgatggac tactggggcc agggcacaag cgtgacagtg  720
tccagc                                                            726

SEQ ID NO: 38              moltype = DNA  length = 720
FEATURE                    Location/Qualifiers
source                     1..720
                           mol_type = other DNA
                           organism = synthetic construct
SEQUENCE: 38
gacatccagc tgacacagag ccccagcaca ctgagcgcca gcgtgggcga tagggtgacc   60
atcacatgta aggcctccca gaacgtgggc accaacgtgg cctggtatca acagaagcct  120
ggccagtccc ccaaggccct gatctacagc gccagctaca gatacagcgg cgtgcctctc  180
agattctccg gctccggctc cggaaccgag ttcaccctga caatcagctc cctgcagccc  240
gatgactttg ccacctacta ctgccagcag tacaatagct actacacctt cggccagggc  300
acaaggctga gatcaaggg cggcggcggc agcggaggag gaggaagcgg aggaggcggc  360
agccaggtgc agctggtgca gagcggcgcc gaggtgaaga agcccggcgc tagcgtgaag  420
gtgtcctgca aggcctccgg ctacacattc accaactacg tgatgcactg ggtgagacag  480
gcccccggcc agggactgga gtggatcgga tacatcctgc cctacaacga cctgaccaag  540
tacaacgaga agttcaaggg cagagccacc ctgaccagcg acaggtccac cagcacagcc  600
tacatggagc tgtcctccct gagaagcgag gacacagccg tgtactactg tgccaggcac  660
gattacgatg cgggcgtgat ggattactgg ggccagggca ccaccgtgac cgtgtccagc  720

SEQ ID NO: 39              moltype = DNA  length = 720
FEATURE                    Location/Qualifiers
source                     1..720
                           mol_type = other DNA
                           organism = synthetic construct
SEQUENCE: 39
gatatccagc tgacccagag ccctagcaca ctgtccgcca gcgtgggcga tagagtgacc   60
atcacctgta aggccagcca gaacgtgggc acaaatgtgg cctggtatca acagaagcct  120
ggccagagcc ccaaggccct gatctacagc gcctcctaca gatactccgg cgtgcctccc  180
```

```
aggtttagcg gctccggcag cggcacagag ttcacactga caatctcctc cctgcagccc   240
gatgattttg ccacctacta ctgtcagcag tacagcagct actacacctt cggccagggc   300
accaggctgg agatcaaggg cggcggcggc agcggaggag gaggaagcgg aggaggcggc   360
tcccaggtgc agctggtgca gtccggcgcc gaggtgaaga agcctggcgc ctccgtgaag   420
gtgtcctgca aggcctccgg ctacacattc actaactacg tgatgcactg ggtgagacag   480
gcccccggcc agggactgga gtggatcgga tacatcctgc cctacaacga tctgaccaag   540
tacaatgaga agttcaaggg cagggccacc ctgacaagcg ataggagcac ctccaccgcc   600
tacatggagc tgtccagcct gagaagcgag gataccgccg tgtactactg cgccaggcac   660
gattacgacg gcggcgtgat ggattactgg ggccagggca caaccgtgac agtgagcagc   720

SEQ ID NO: 40          moltype = DNA   length = 720
FEATURE                Location/Qualifiers
source                 1..720
                       mol_type = other DNA
                       organism = synthetic construct
SEQUENCE: 40
gacatccagc tgacccagag cccctccacc ctgagcgcct ccgtgggaga tagagtgaca    60
atcacctgca aggcctccca gaatgtgggc accaatgtgg cctggtatca acagaagccc   120
ggccagtccc ccaaggccct gatctactcc gcctcctaca gatactccgg cgtgccctcc   180
agattttccg gcagcggcag cggcacagag ttcacactga ccatcagctc cctgcagccc   240
gacgactttg ccacctacta ctgtcagcag tacaatagct actacacatt tggccagggc   300
accagactgg agatcaaggg cggcggcggc agcggaggag gaggaagcgg aggaggcggc   360
agccaggtgc agctggtgca gagcggcgcc gaggtgaaga agcccggcgc ttccgtgaag   420
gtgagctgta aggcctccgg ctacacattc accaactacg tgatgcactg ggtgagacag   480
gcccctggcc agggcctgga gtggatcgga tacatcctgc cttacaacga tctgaccaag   540
tacaacgaga agtttaaggg cagggccacc ctgacaagcg ataggagcac aagcaccgcc   600
tacatggagc tgtccagcct gagaagcgag gatacagccg tgtactactg tgccagacac   660
gactacgacg ccggcgtgat ggactactgg ggccagggca caacagtgac agtgtccagc   720

SEQ ID NO: 41          moltype = DNA   length = 720
FEATURE                Location/Qualifiers
source                 1..720
                       mol_type = other DNA
                       organism = synthetic construct
SEQUENCE: 41
gatatccagc tgacacagag cccttccacc ctgagcgcct ccgtgggcga cagagtgacc    60
atcacctgca aggcctccca gaacgtgggc acaaatgtgg cctggtatca acagaagccc   120
ggccagtccc ccaaggccct gatctactcc gccagctaca ggtacagcgg cgtgccctcc   180
agattctccg gcagcggcag cggcacagag tttacactga ccatcagctc cctgcagcct   240
gacgacttcg ccacctacta ctgccagcag tacagctcct actacacctt cggccagggc   300
acaagactgg agatcaaggg cggcggcggc agcggaggag gaggaagcgg aggaggcggc   360
tcccaggtgc agctggtgca gtccggcgcc gaggtgaaga agcctggcgc ctccgtgaag   420
gtgagctgta aggcctccgg ctacaccttc acaaactacg tgatgcactg ggtgaggcag   480
gcccccggcc agggactgga atggatcgga tacatcctgc cctacaacga tctgacaaag   540
tacaatgaga agtttaaggg cagagccaca ctgacatccg ataagcac atccaccgcc   600
tacatggagc tgagctccct gaggtccgag gataccgccg tgtactactg tgccagacac   660
gactacgacg ccggcgtgat ggactactgg ggccagggca ccaccgtgac agtgtcctcc   720

SEQ ID NO: 42          moltype = DNA   length = 720
FEATURE                Location/Qualifiers
source                 1..720
                       mol_type = other DNA
                       organism = synthetic construct
SEQUENCE: 42
gacatccagc tgacccagag ccccagcaca ctgagcgcca gcgtgggcga tagagtgacc    60
atcacatgca aggccagcca gaatgtgggc acaaatgtgg cctggtatca acagaagccc   120
ggcaaggccc ctaaggccct gatctacagc gccagctaca gatactccgg cgtgcctagc   180
agattcagcg gcagcggctc cggcaccgag tttacactga ccatcagcag cctgcagcct   240
gatgattttg ccacctacta ctgccagcag tacagcagct actacacctt cggccagggc   300
accaggctgg agatcaaggg cggcggcggc agcggaggag gaggaagcgg aggaggcggc   360
tcccaggtgc agctggtgca gagcggcgcc gaggtgaaga agcccggcgc ttccgtgaag   420
gtgtcctgta aggccagcgg ctacaccttt acaaactacg tgatgcactg ggtgaggcag   480
gcccctggcc agggactgga gtggatgggc tacatcctgc cctacaatga cctgaccaag   540
tacaacgaga agtttaaggg cagagtgaca ctgacatccg ataggtccac atccaccgtg   600
tacatggagc tgagctccct gaggagcgag gacaccgccg tgtactactg cgccagacac   660
gactacgatg gcggcgtgat ggactactgg ggccagggca caacagtgac cgtgtcctcc   720

SEQ ID NO: 43          moltype = DNA   length = 720
FEATURE                Location/Qualifiers
source                 1..720
                       mol_type = other DNA
                       organism = synthetic construct
SEQUENCE: 43
gacatccagc tgacacagag cccctccacc ctgtccgcct ccgtgggaga tagggtgacc    60
atcacatgta aggcctccca gaacgtgggc accaacgtgg cctggtatca acagaagccc   120
ggcaaggccc ctaaggccct gatctacagc gccagctaca gatactccgg cgtgccctcc   180
agattttccg gctccggcag cggcacagag tttacactga ccatctccag cctgcagccc   240
gacgactttg ccacctacta ctgtcagcag tacaacagct actacacctt tggccagggc   300
accagactgg agatcaaggg cggcggcggc agcggaggag gaggaagcgg aggaggcggc   360
```

```
                                                -continued
tcccaggtgc agctggtgca gtccggcgcc gaggtgaaga agcctggcgc ctccgtgaag 420
gtgtcctgta aggccagcgg ctacaccttt acaaactacg tgatgcactg ggtgaggcag 480
gcccctggcc agggactgga gtggatgggc tacatcctgc cctacaacga cctgacaaag 540
tacaacgaga agttcaaggg cagagtgacc ctgacaagcg ataggtccac ctccaccgtg 600
tacatggagc tgtccagcct gaggtccgag gataccgccg tgtactactg cgccagacac 660
gactacgatg ccggcgtgat ggattactgg ggccagggca caaccgtgac cgtgtcctcc 720

SEQ ID NO: 44         moltype = DNA   length = 720
FEATURE               Location/Qualifiers
source                1..720
                      mol_type = other DNA
                      organism = synthetic construct
SEQUENCE: 44
gatatccagc tgacccagtc ccccagcaca ctgagcgcca gcgtgggcga tagggtgacc 60
atcacctgca aggccagcca gaacgtgggc accaacgtgg cctggtatca acagaagcct 120
ggcaaggccc ccaaggccct gatctactcc gccagctaca ggtacagcgg cgtgcctagc 180
aggttcagcg gctccggctc cggcacagag ttcaccctga ccatctccag cctgcagcct 240
gacgattttg ccacctacta ctgtcagcag tacagcagct actacacatt cggccagggc 300
acaagactgg agatcaaggg cggcggcggc agcggaggag gaggaagcgg aggaggcggc 360
agccaggtgc agctggtgca gagcggcgcc gaggtgaaga agcctggcgc cagcgtgaag 420
gtgagctgta aggccagcgg ctacacattc acaaattacg tgatgcactg ggtgagacag 480
gcccccggcc agggactgga gtggatggga tacatcctgc cctacaacga cctgacaaag 540
tacaacgaga agtttaaggg cagggtgacc ctgacatccg acagaagcac ctccaccgtg 600
tacatggagc tgtcctccct gagatccgag gacacagccg tgtactactg tgccagacac 660
gactacgatg ccggcgtgat ggattactgg ggccagggca ccaccgtgac cgtgagctcc 720

SEQ ID NO: 45         moltype = AA   length = 21
FEATURE               Location/Qualifiers
source                1..21
                      mol_type = protein
                      organism = synthetic construct
SEQUENCE: 45
MALPVTALLL PLALLLHAAR P                                             21

SEQ ID NO: 46         moltype = AA   length = 69
FEATURE               Location/Qualifiers
source                1..69
                      mol_type = protein
                      organism = synthetic construct
SEQUENCE: 46
TTTPAPRPPT PAPTIASQPL SLRPEACRPA AGGAVHTRGL DFACDIYIWA PLAGTCGVLL   60
LSLVITLYC                                                           69

SEQ ID NO: 47         moltype = AA   length = 42
FEATURE               Location/Qualifiers
source                1..42
                      mol_type = protein
                      organism = synthetic construct
SEQUENCE: 47
KRGRKKLLYI FKQPFMRPVQ TTQEEDGCSC RFPEEEEGGC EL                      42

SEQ ID NO: 48         moltype = AA   length = 112
FEATURE               Location/Qualifiers
source                1..112
                      mol_type = protein
                      organism = synthetic construct
SEQUENCE: 48
RVKFSRSADA PAYKQGQNQL YNELNLGRRE EYDVLDKRRG RDPEMGGKPR RKNPQEGLYN   60
ELQRDRMAEA YSEIGMKGER RRGKGHDGLY QGLSTATKDT YDALHMQALP PR          112
```

ANTIBODY TARGETING B CELL MATURATION ANTIGEN AND RELATED PRODUCTS THEREOF AND MEDICAL APPLICATIONS

SEQUENCE LISTING

The instant application contains a Sequence Listing with 48 sequence, which has been submitted electronically in XML format and is hereby incorporated herein by reference in its entirety. Said XML copy, created on Sep. 24, 2024, is named HBJS-US-1-30-SEQ.xml, and is 51,397 bytes in size.

CROSS-REFERENCE TO RELATED APPLICATION

This application claims priority of Chinese Patent Application No. 202311289005.6, filed on Oct. 8, 2023, the entire contents of which are incorporated herein by reference.

TECHNICAL FIELD

The present disclosure belongs to the fields of biotechnology and biological medicine, and specifically relates to an antibody targeting a B cell maturation antigen (BCMA) and related products thereof and medical applications.

BACKGROUND

BCMA, i.e. CD269, a member of tumor necrosis factor (TNF) receptor super-family, can bind to B cell activating factors and proliferation-inducing ligands, and is preferentially expressed in mature B lymphocytes. BCMA is expressed significantly higher in multiple myeloma (MM) than in healthy plasma cells, and a growing number of evidences show that BCMA acts as one of the target antigens suitable for treating MM.

Limited by ethics, experimental animals including mice, rabbits and alpacas, rather than human body are served for antibody screening, of which, mice are most extensively applied due to minimum screening cost, and accordingly, most antibodies are mouse-derived. As monoclonal drugs emerge, followed by chimeric antigen receptor T (CAR-T) and CAR-natural killer (CAR-NK) cell immunotherapies, the antibody screening based on experimental animals is further applied in an extensive field over recent years. Following the extensive application of products based on monoclonal antibody, CAR-T and CAR-NK cells, researches find that if the animal-derived antibodies such as mouse-derived antibodies, and CAR are directly applied in human body, they are regarded as heterogeneous and heterologous proteins by an immune system of human body. This allows for the generation of obvious antigen-antibody reaction, resulting in a lot of antibodies being produced in human body, thereby affecting the therapeutic effect of mouse-derived antibodies on the human body. To solve this problem, one of the effective approaches involves the usage of bioinformatics data and knowledge to optimize codons of nucleic acid sequences of the screened mouse-derived antibodies, allowing the antibody to be expressed in more consistent with the expression habits in the human body. Meanwhile, bioinformatics algorithms are employed to perform humanized optimization on framework regions (FRs) of the antibodies in the case that the complementarity-determining region (CDR) remains unchanged, so that the sequences of the mouse-derived antibodies are ultimately transformed to sequences close to sequences of natural antibodies in human body to the greatest extent. The optimized antibodies, which are known as humanized antibodies, show no significant antigen-antibody reactions in human body, maximizing the therapeutic effect of the antibody drugs, CAR-T, and CAR-NK.

SUMMARY

In the present disclosure, a sequence of a mouse-derived antibody targeting a BCMA antigen is obtained through screening test, and a plurality of sequences of a humanized scFv antibody targeting a BCMA antigen after optimizing the sequence of the mouse-derived antibody. A CAR containing the antibody is constructed and is transduced into human NK cells to successfully prepare CAR-NK cells, which exhibit good therapeutic effects in both in vivo and in vitro experiments. The CAR-NK cells obtained by humanized antibody are higher in stability of positive rate and in killing ability than the mouse-derived antibody.

Specifically, the present disclosure provides the following technical solutions.

In a first aspect, the present disclosure provides an antibody or an antigen binding fragment thereof targeting a BCMA, the antibody containing a variable light chain and a variable heavy chain, the variable light chain containing a light chain CDR1, a light chain CDR2, and a light chain CDR3, the light chain CDR1 having a sequence as shown in SEQ ID NO. 1, the light chain CDR2 having an amino acid sequence as shown in SEQ ID NO. 2, and the light chain CDR3 being as shown in SEQ ID NO. 3 or SEQ ID NO. 4; and the variable heavy chain containing a heavy chain CDR1, a heavy chain CDR2, and a heavy chain CDR3, the heavy chain CDR1 having a sequence as shown in SEQ NO. 5, the heavy chain CDR2 having an amino acid sequence as shown in SEQ ID NO. 6, and the heavy chain CDR3 being as shown in SEQ ID NO. 7 or SEQ ID NO. 8.

Preferably, the antibody further includes a light chain FR1, a light chain FR2, a light chain FR3, a light chain FR4, a heavy chain FR1, a heavy chain FR2, a heavy chain FR3 and a heavy chain FR4.

Preferably, the light chain FR1 may be as shown in any one of SEQ ID NO. 9-10. Preferably, the light chain FR2 may be as shown in any one of SEQ ID NO. 11-12. Preferably, the light chain FR3 may be as shown in any one of SEQ ID NO. 13-14. Preferably, the light chain FR4 may be as shown in any one of SEQ ID NO. 15-16. Preferably, the heavy chain FR1 may be as shown in any one of SEQ ID NO. 17-18. Preferably, the heavy chain FR2 may be as shown in any one of SEQ ID NO. 19-21. Preferably, the heavy chain FR3 may be as shown in any one of SEQ ID NO. 22-24. Preferably, the heavy chain FR4 may be as shown in any one of SEQ ID NO. 25-26.

Preferably, the antibody has a link mode of the variable light chain—a connexon—the variable heavy chain.

More preferably, the antibody is humanized. Specifically, the humanized antibody is more stable in expression and stronger in killing target cells.

More preferably, the antibody has a complete sequence as shown in SEQ ID NO. 28-35.

The term "antigen binding fragment" used herein refers to an antibody fragment formed by a portion of the antibody, and contains one or more CDRs or any other antibody fragments bonded to an antigen but free of a complete natural antibody structure. For example, the antigen binding fragment includes, but is not limited to, bifunctional antibodies, Fab, Fab', F(ab')2, Fv fragments, disulfide bond-stabilized Fv fragments (dsFv), (dsFv)2, bispecific dsFv (dsFv-dsFv'), disulfide bond-stabilized bifunctional antibodies (ds bifunctional antibodies), single chain antibody molecules (scFv), scFv dimers (bivalent bifunctional antibodies), bispecific antibodies, multispecific antibodies, camelid single structural domain antibodies, nanobodies, structural domain antibodies, and bivalent structural domain antibodies. The antigen binding fragment is capable of binding to the same antigen that a parental antibody binds to.

More preferably, the antibody further contains a heavy chain constant region and a light chain constant region.

In another aspect, the present disclosure provides an antibody complex, the antibody complex being formed by linking a structural domain with a peptide bond to an amino terminal and/or a carboxyl terminal of the foregoing antibody or an antigen binding fragment thereof.

Preferably, the structural domain includes a hinge region, a transmembrane structural domain and/or a signal transduction structural domain.

Preferably, the signal transduction structural domain includes a co-stimulatory structural domain and/or an intracellular signal transduction structural domain.

Preferably, the hinge region includes one or a combination of a cluster of differentiation (CD) 8 hinge region, a CD28 hinge region, a CD4 hinge region, a CD5 hinge region, a CD134 hinge region, a CD137 hinge region, and an inducible co-stimulator (ICOS) hinge region.

Preferably, the hinge chain is the CD8 hinge chain, having an amino acid sequence as shown in SEQ ID NO. 45.

Preferably, the transmembrane structural domain includes a transmembrane structural domain of a protein, the protein including proteins expressed by a 2B4 gene, an a, B or (chain of a T cell receptor, CD28, CD38, CD45, CD4, CD5, CD8, CD9, CD16, CD22, CD33, CD37, CD64, CD80, CD86, CD123, CD134, CD137 and CD154.

Preferably, the transmembrane structural domain is the CD8 transmembrane structural domain, having an amino acid sequence as shown in SEQ ID NO. 46.

Preferably, the co-stimulatory structural domain includes a functional signal transduction structural domain of 4-1BB, 2B4, CD3ζ, OX40, CD2, CD27, CD28, CDS, ICAM-1, LFA-1 (CD11a/CD18), ICOS (CD278) and 4-1BB (CD137).

Preferably, the co-stimulatory structural domain is the 4-1BB co-stimulatory structural domain, having an amino acid sequence as shown in SEQ ID NO. 47.

Preferably, the intracellular signal transduction structural domain includes a signal transduction region formed arbitrarily by one or more proteins of CD3-ζ, FcERIγ, FcRγ, FcRβ, CD3γ, CD3δ, CD3ε, CD5, CD22, CD79a, CD79b and CD66d.

Preferably, the intracellular signal transduction structural domain has an amino acid sequence as shown in SEQ ID NO. 48.

More preferably, the antibody complex is CAR.

Preferably, the structural domain further includes a signal peptide.

Preferably, a CD8 signal peptide is selected for testing in the present disclosure.

The CAR used herein, a receptor synthesized artificially, can direct immune cells to specifically trace, identify and remove tumor cells expressing related targeting ligands. The CAR is typically formed by an extracellular binding domain that can identify tumor-associated antigens (typically being scFv fragments from an antigen binding region of a monoclonal antibody), a hinge domain, a transmembrane domain, and an intracellular signal structural domain, and is of highly targeted.

In another aspect, the present disclosure provides a nucleic acid molecule encoding the foregoing antibody.

Preferably, the nucleic acid molecule is as shown in SEQ ID NO. 37-44.

In another aspect, the present disclosure provides a nucleic acid molecule encoding the foregoing antibody complex.

In another aspect, the present disclosure provides a vector, the vector containing the forgoing nucleic acid molecule encoding an antibody and/or a deoxyribonucleic acid (DNA) molecule of the forgoing polypeptide complex, or, the vector expressing the forgoing antibody or an antigen binding fragment thereof targeting a BCMA, or, an antibody complex.

Preferably, the vector is an expression vector.

Preferably, the vector is a virus expression vector.

Preferably, the virus expression vector includes a lentiviral vector, an adenoviral vector, an adeno-associated virus expression vector or other types of viral vectors.

In another aspect, the present disclosure provides a host cell, the host cell containing one or more of the foregoing antibody, the foregoing polypeptide complex, a DNA molecule encoding the foregoing antibody, a DNA molecule of the foregoing polypeptide complex, and the foregoing vector.

Preferably, the host cell includes prokaryotic cells and eukaryotic cells.

Preferably, the prokaryotic cells are bacterial cells such as *Agrobacterium* and *Escherichia coli*.

Preferably, the bacterial cell includes Gram-negative microorganisms and Gram-positive microorganisms.

Preferably, the eukaryotic cells are fungal cells, i.e. yeast cells.

Preferably, the eukaryotic cells are animal cells, insect cells, and plant cells.

Preferably, the animal cell includes human-derived cells or non-human-derived cells.

Preferably, the human-derived cells are immune cells.

Preferably, the immune cell includes one or more of T cells, B cells, K cells, and NK cells. Preferably, the immune cells are the NK cells or the T cells.

Preferably, the immune cells are autologous or xenogenous.

Preferably, the immune cell is derived from peripheral blood (PB), umbilical cord blood (UCB), human embryonic stem cells (HESC), induced pluripotent stem cells (IPSC) or a commercialized cell line.

In another aspect, the present disclosure provides an antibody conjugate, the antibody conjugate containing the forgoing antibody, and further containing a conjugated portion selected from the following group: a detectable marker, a drug, a toxin, a cytokine or an enzyme.

In another aspect, the present disclosure provides a drug composition for treating BCMA-related diseases, the drug composition containing one or more of the forgoing antibody or an antigen binding fragment thereof, the forgoing antibody complex, a nucleic acid molecule encoding the forgoing antibody, a nucleic acid molecule encoding the forgoing antibody complex, a vector, a host cell, and an antibody conjugate; and/or a pharmaceutically acceptable vector.

Preferably, the drug composition may further contain other active ingredients, such as sunitinib (sutent), iressa (gefitinib tablets), tarceva (erlotinib), herceptin (trastuzumab), avastin (bevacizumab), arsenic trioxide, trans-retinoic acid, velcade (bortezomib), temodar, erbitux (cetuximab), dasatinib (sprycel), sorafenib (nexavar), vectibix (panitumumab), TS-1, and ixempra (ixabepilone).

Preferably, the drug composition may further contain a pharmaceutically acceptable excipient.

Preferably, the pharmaceutically acceptable excipient includes any one or a combination of at least two of a diluent, a vehicle, a filling agent, a binding agent, a wetting agent, a disintegrant, an emulsifier, a cosolvent, a solubilizer, an osmotic pressure regulator, a surfactant, a coating material, a staining agent, a pH regulator, an antioxidant, a bacteriostatic agent or a buffering agent.

Preferably, the drug combined composition is in the form of capsules, tablets, pills, powders, granules, emulsions, solutions, suspensions, syrups, or tinctures.

In another aspect, the present disclosure provides a method for detection of BCMA, the method including a step of contacting the forgoing antibody or an antigen binding fragment thereof with a sample to be detected.

Preferably, the antibody or the antigen biding fragment thereof is an antibody having a detectable marker.

Preferably, the detectable marker includes an enzyme, a fluorescent material, a luminescent material, a radioactive material, a positron emission metal, and a non-radioactive paramagnetic metal ion.

Preferably, the method further includes a step of detecting a reaction between the sample to be detected and the antibody after being bonded.

Preferably, the sample to be detected includes a physiological body fluid, the physiological body fluid including blood, a serum, plasma, saliva, an eye secretion, a cerebrospinal fluid, pus, an exudate, breast milk, sweat, a tear, an ear effluent, a sputum, lymph, urine or feces; and the sample to be detected further includes a tissue, the tissue including a lung, a spleen and a kidney.

Preferably, the sample to be detected contains B cells.

Preferably, the detection is for non-diagnostic purposes.

In another aspect, the present disclosure provides a treatment method for cancers, the method including administering the foregoing antibody or an antigen binding fragment thereof, the foregoing polypeptide complex, a nucleic acid molecule encoding the foregoing antibody, a nucleic acid molecule encoding the foregoing antibody complex, the foregoing vector, the foregoing host cell, or the foregoing drug composition to a subject.

Preferably, a mode of the administration includes enteral or non-enteral administration, such as oral, intravenous, intramuscular, subcutaneous, nasal, oral mucosal, ocular, pulmonary and respiratory, dermal, vaginal, or rectal administration.

Most preferably, the cancer is MM.

Preferably, the treatment method may be combined with other therapy approaches including chemotherapy, radiotherapy, immunotherapy, gene therapy, and surgery.

In another aspect, the present disclosure provides an application of any one or more of the foregoing antibody or an antigen binding fragment thereof, the foregoing polypeptide complex, a nucleic acid molecule encoding the foregoing antibody, a nucleic acid molecule encoding the foregoing antibody complex, the foregoing vector, the foregoing host cell, or the foregoing drug composition in combination with BCMA.

In another aspect, the present disclosure provides an application of any one or more of the foregoing antibody or an antigen binding fragment thereof, the foregoing polypeptide complex, a nucleic acid molecule encoding the foregoing antibody, a nucleic acid molecules encoding the foregoing antibody complex, the foregoing vector, the foregoing host cell, or the foregoing drug composition in the preparation of a drug for treating cancers or immune cell-mediated immune diseases expressing BCMA.

Preferably, the cancer includes a plasma cell malignant tumor or a B-cell malignant tumor.

Preferably, the cancer includes leukemia, lymphoma or myeloma.

Preferably, the cancer includes cancers associated with high BCMA expression.

Most preferably, the cancer includes MM, Hodgkin's lymphoma, leukemia, glioblastoma, non-Hodgkin's lymphoma (NHL), myelodysplastic syndrome (MDS), myeloproliferative syndrome (MPS), monoclonal gammopathy of undetermined significance (MGUS), solitary plasmacytoma, Waldenstrom macroglobulinemia, AL amyloidosis, plasma cell leukemia, and Burkett's lymphoma.

Most preferably, the cancer is MM.

Preferably, the immune cells are B cells.

Preferably, the immune disease includes rheumatoid arthritis, systemic lupus erythematosus (SLE), type I diabetes mellitus, asthma, atopic dermatitis, allergic rhinitis, thrombocytopenia purpura, multiple sclerosis, psoriasis, Sjogren's syndrome, Hashimoto's thyroiditis, Grave's diseases, primary biliary sclerosis, Wegener's granulomatosis, tuberculosis, and graft versus host diseases.

DETAILED DESCRIPTION

The present disclosure is further described below by reference to the embodiments, and what described in the following is merely the preferred embodiments of the present disclosure, rather than a limitation to the present disclosure in any other form. The above disclosed technical contents can be altered to equivalent embodiments by any skilled familiar with the field, and without departing from the content of the solutions of the present disclosure, any simple modifications or equivalent changes to the following embodiments based on the technical substance of the present disclosure fall within the scope of protection of the present disclosure.

Embodiment 1, Determination of the Affinity of Mouse-Derived Antibody to Myeloma Cells A mouse-derived antibody was obtained and the affinity of the antibody to myeloma cells was detected. The mouse-derived antibody had an amino acid sequence as shown in SEQ ID NO. 27 and a nucleotide sequence as shown in SEQ ID NO. 36.

Determination Method

1. H929 myeloma cells were cultured, and then subjected to cell counting. $5 \times 10^5$ cells were taken and placed in a 1.5 mL Eppendorf (EP) tube for centrifuging at 1000 rpm for 5 min, and supernatant was removed.

2. 500 μL of phosphate buffered saline (PBS) was added to resuspend the cells, and the resuspended cells were centrifuged at 1000 rpm for 5 min, and supernatant was removed.

3. Supernatant from blank cell culture and supernatant produced from antibody were separately used to resuspend cells to be tested. The resuspended cells were protected from light for reacting at 4° C. for 30 min, and then centrifuged at 1000 rpm for 5 min, and supernatant was removed.

4. 500 μL of PBS was added to resuspend the cells, and the resuspended cells were centrifuged at 1000 rpm for 5 min, and supernatant was removed.

5. 100 μL of secondary antibody (PE anti-human IgG Fc Antibody, diluted by 1:600 with PBS) was added to resuspend the cells. The resuspended cells were protected from light for reacting at 4° C. for 30 min, and then centrifuged at 1000 rpm for 5 min, and supernatant was removed.

6. 500 μL of PBS was added to resuspend the cells, and the resuspended cells were centrifuged at 1000 rpm for 5 min, and supernatant was removed.

7. 400 μL of PBS was added to resuspend the cells, and the resuspended cells were detected by a machine.

Figure 1A:
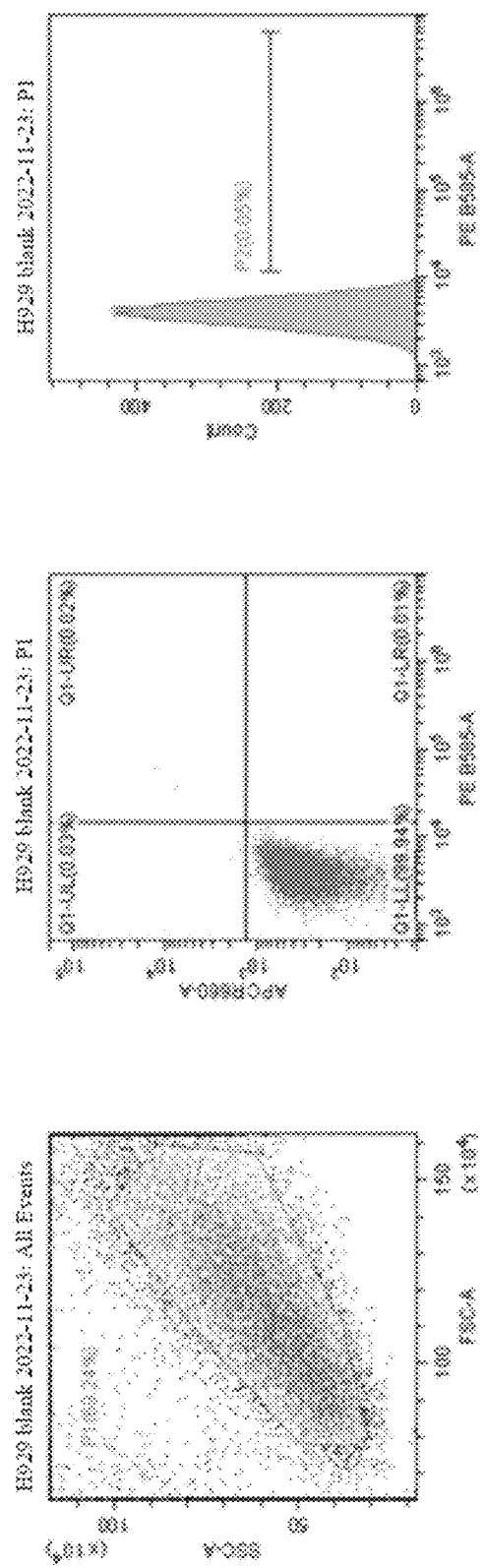
FIG. 1A is a graph showing the affinity of a mouse-derived antibody to BCMA in an H929 blank group.
Figure 1B:
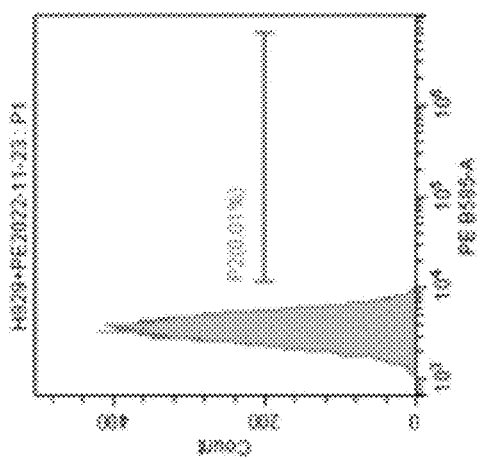
FIG. 1B is a graph showing the affinity of the mouse-derived antibody to BCMA in an H929+PE fluorescence group.
Figure 1B:
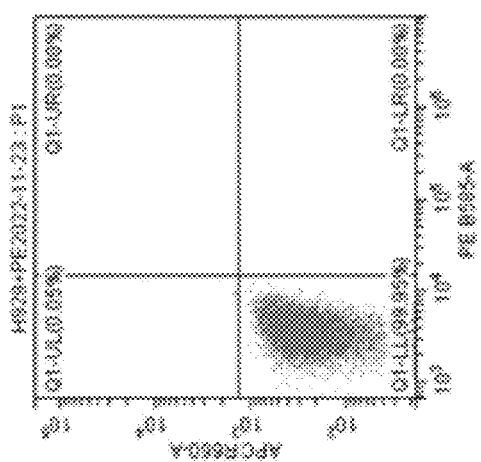
Figure 1B:
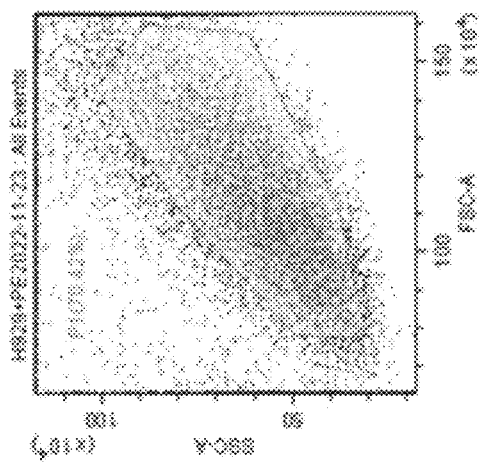
Figure 1C:
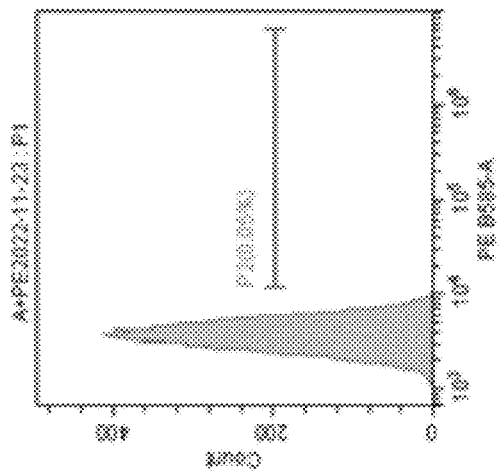
FIG. 1C is a graph showing the affinity of the mouse-derived antibody to BCMA in a negative control group.
Figure 1C:
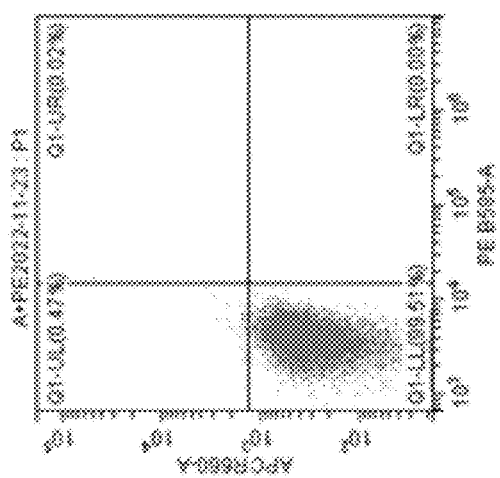
Figure 1C:
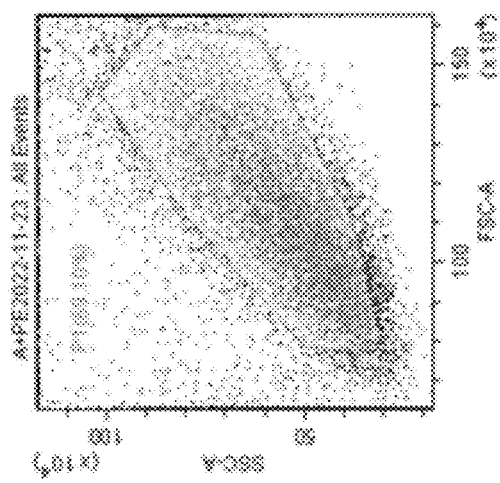
Figure 1D:
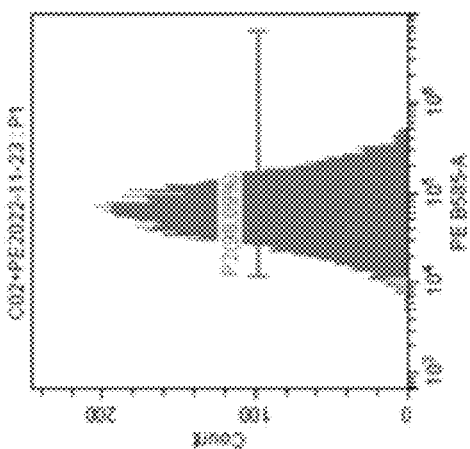
FIG. 1D is a graph showing the affinity of the mouse-derived antibody to BCMA in a positive control group.
Figure 1D:
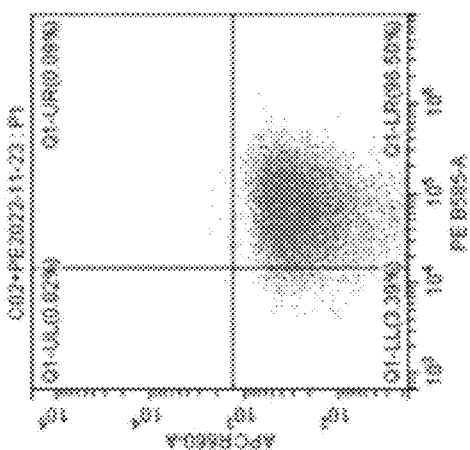
Figure 1D:
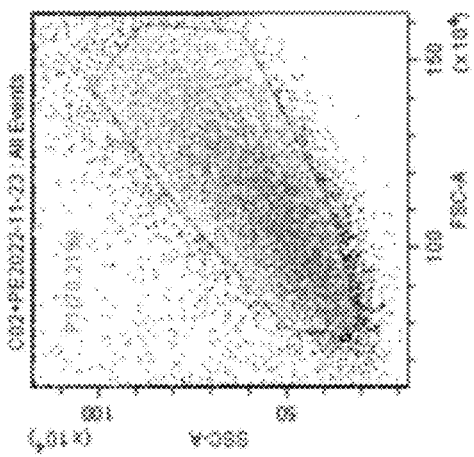
Figure 1E:
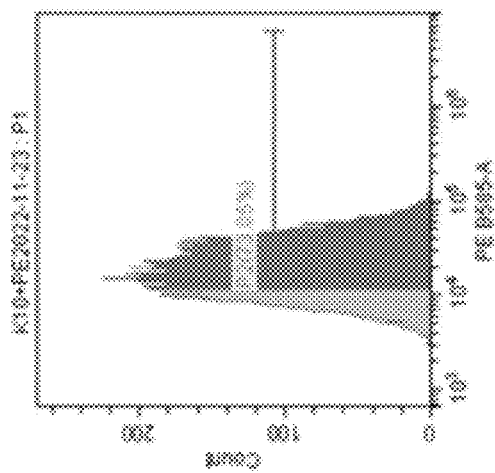
FIG. 1E is a graph showing the affinity of the mouse-derived antibody to BCMA.
Figure 1E:
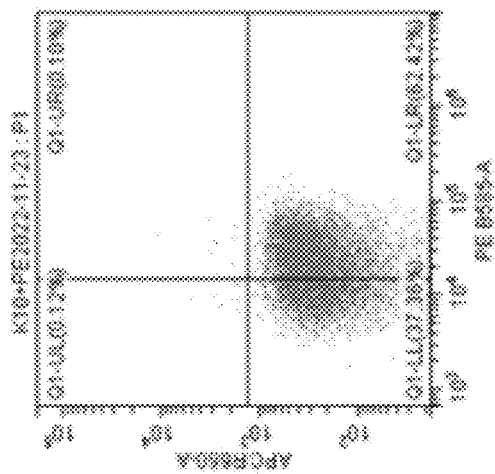
Figure 1E:
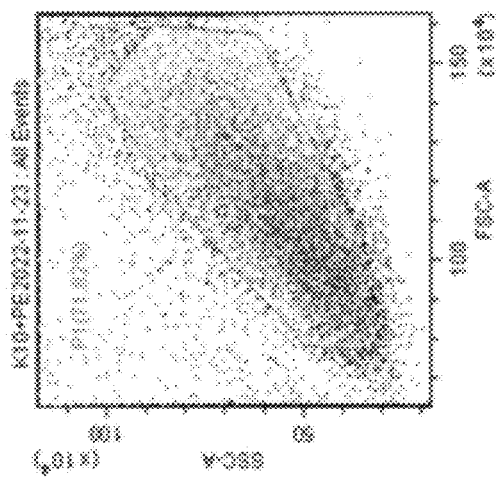
Figure 2A:
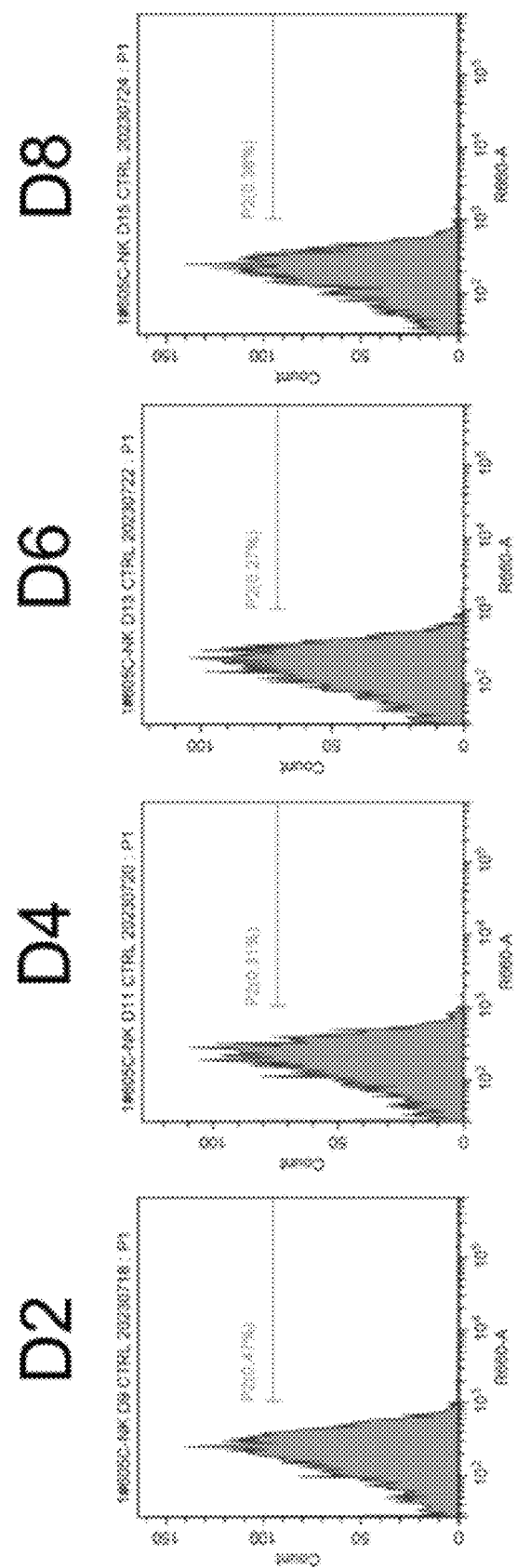
FIG. 2A is a graph showing the expression of BCMA-CAR in NK cells in a negative control group.
Figure 2B:
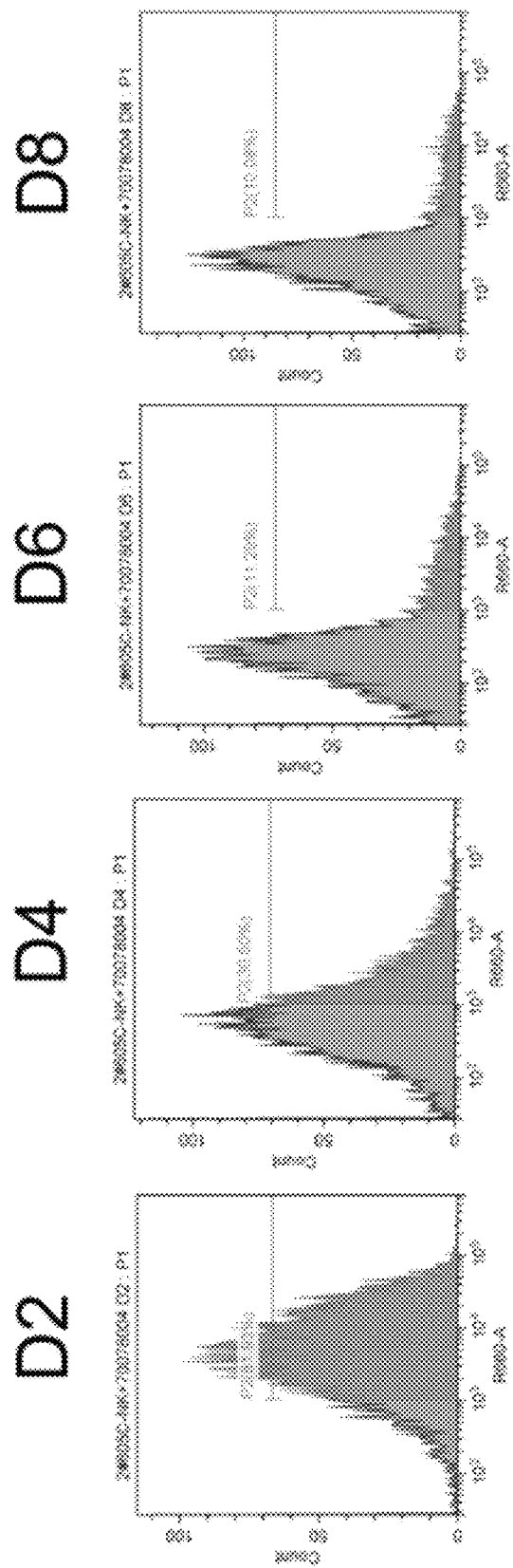
FIG. 2B is a graph showing the expression of mouse-derived BCMA-CAR in NK cells.
Figure 2C:
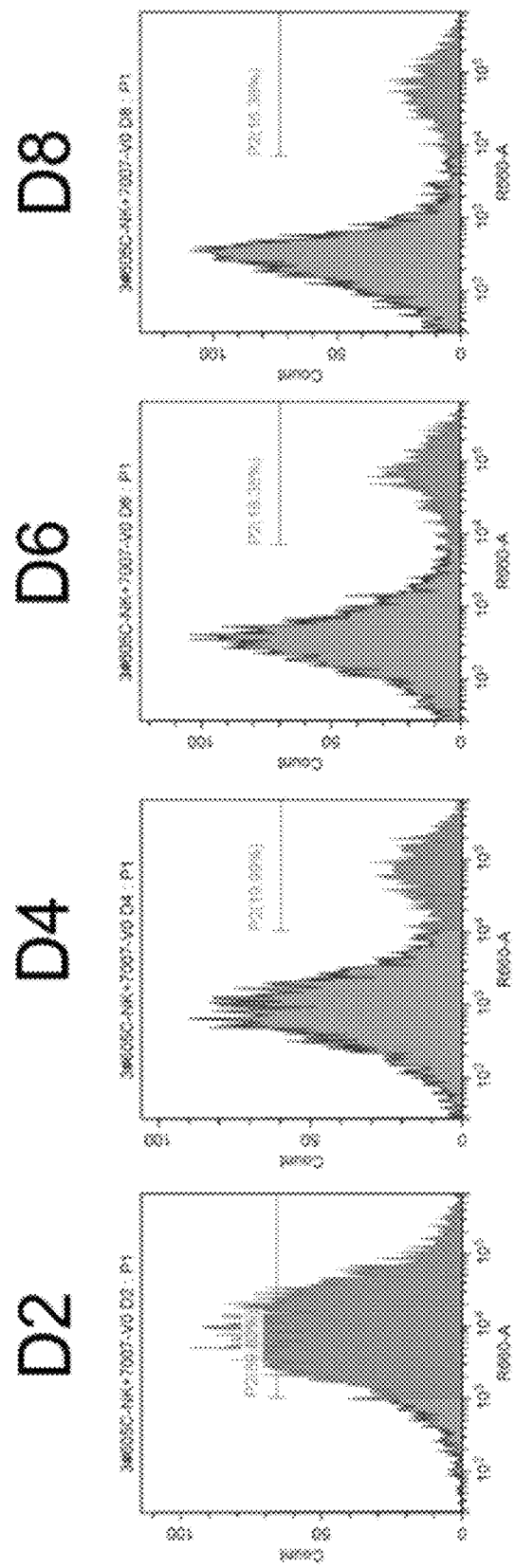
FIG. 2C is a graph showing the expression of humanized BCMA-CAR-V0 in NK cells.
Figure 2D:
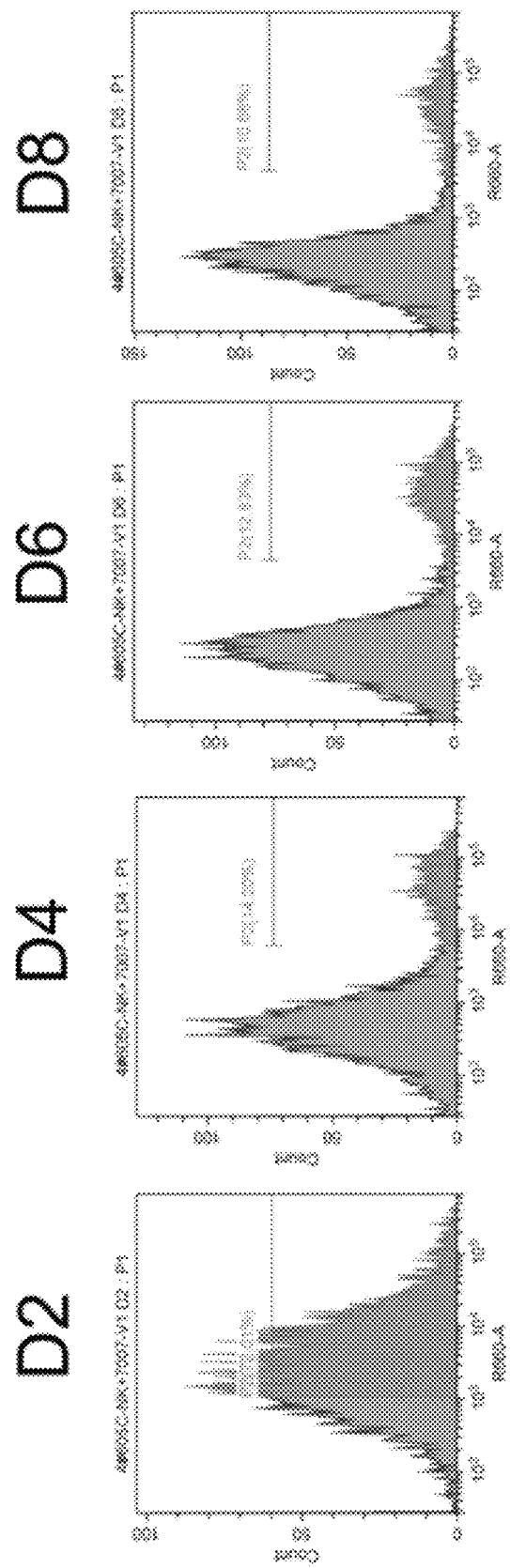
FIG. 2D is a graph showing the expression of humanized BCMA-CAR-V1 in NK cells.
Figure 2E:
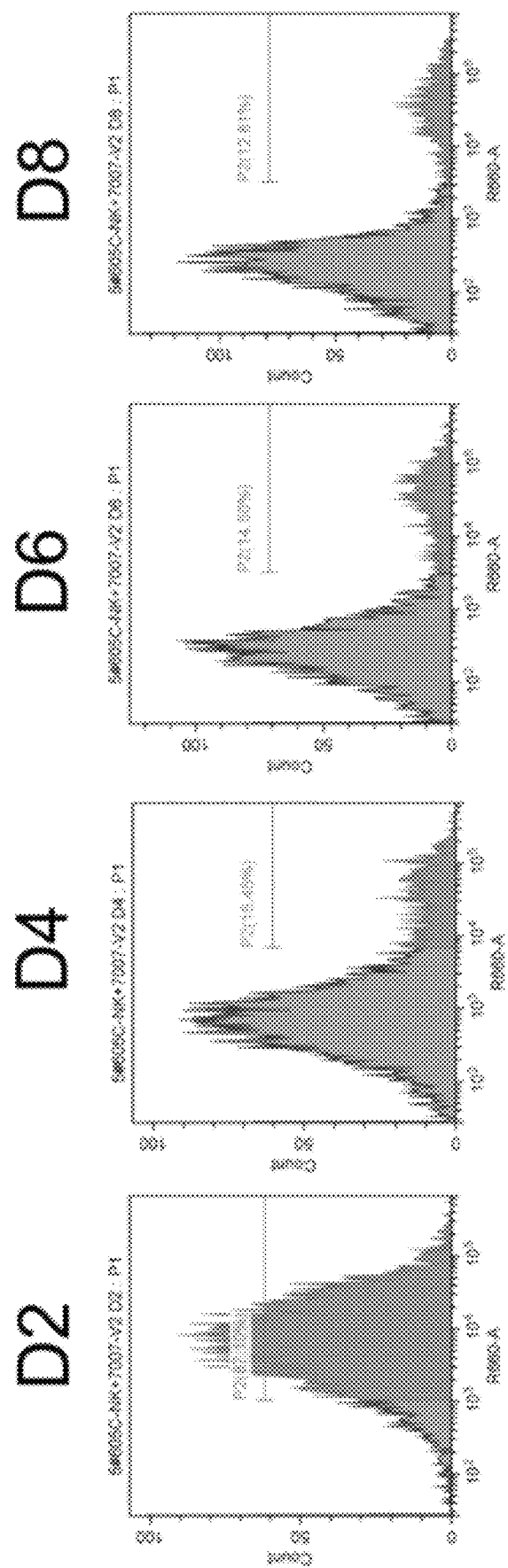
FIG. 2E is a graph showing the expression of humanized BCMA-CAR-V2 in NK cells.
Figure 2F:
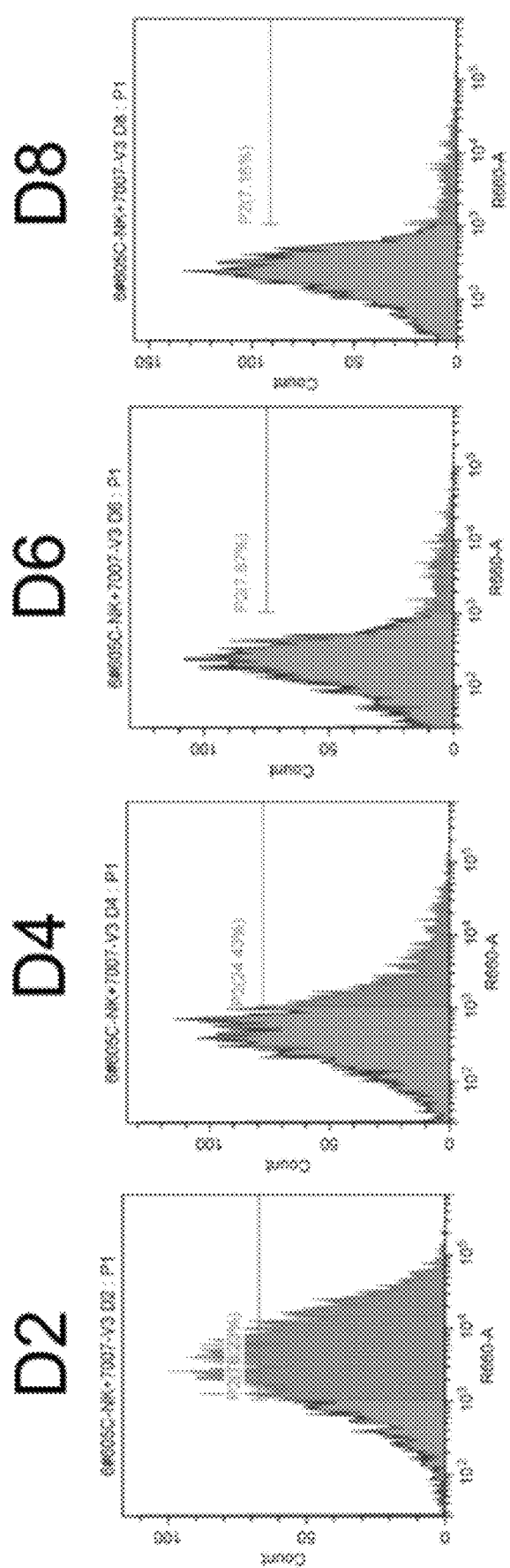
FIG. 2F is a graph showing the expression of humanized BCMA-CAR-V3 in NK cells.
Figure 2G:
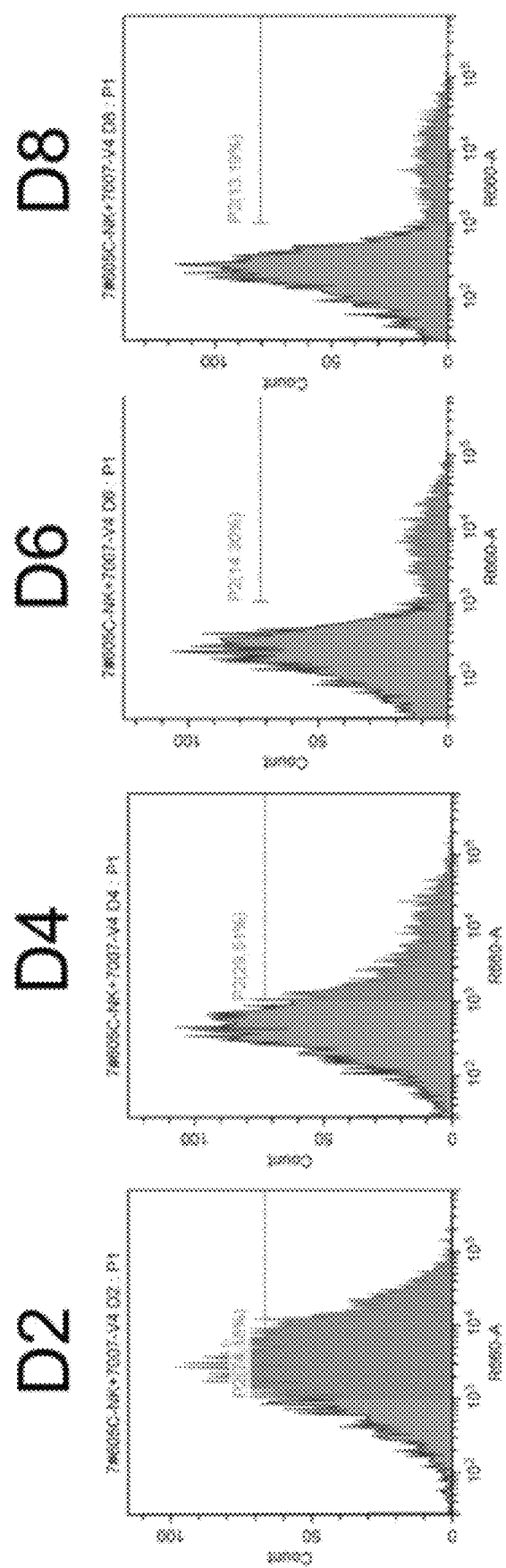
FIG. 2G is a graph showing the expression of humanized BCMA-CAR-V4 in NK cells.
Figure 2H:
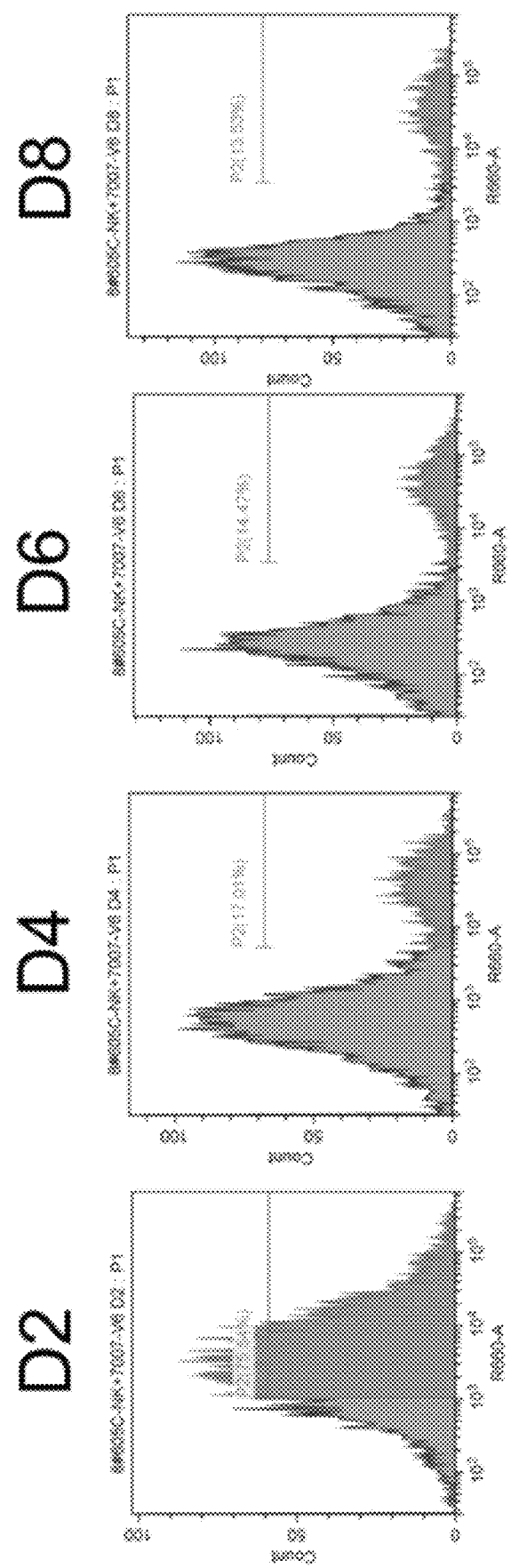
FIG. 2H is a graph showing the expression of humanized BCMA-CAR-V6 in NK cells.
Figure 2I:
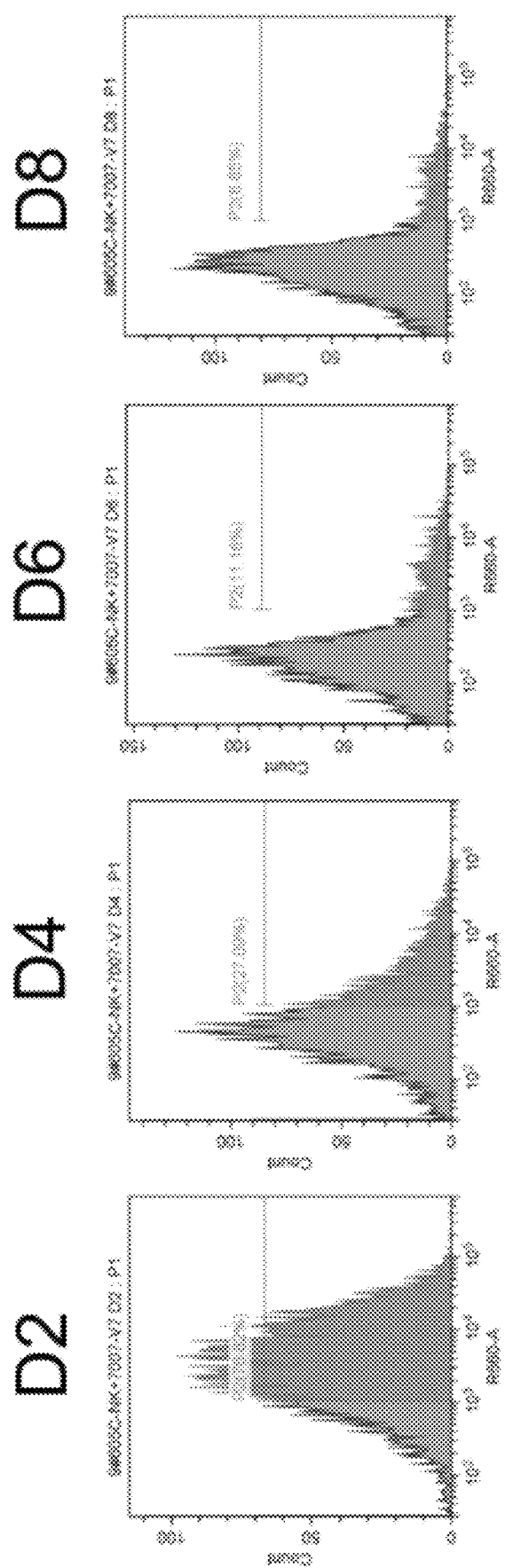
FIG. 2I is a graph showing the expression of humanized BCMA-CAR-V7 in NK cells.
Figure 2J:
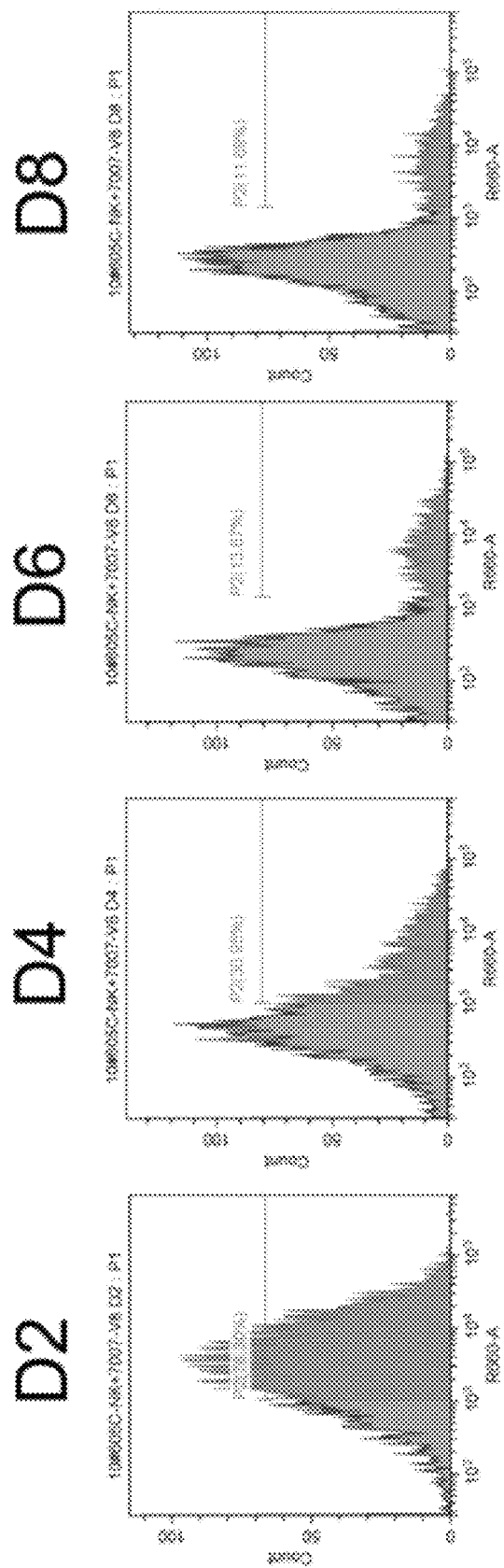
FIG. 2J is a graph showing the expression of humanized BCMA-CAR-V8 in NK cells.
Figure 3A:
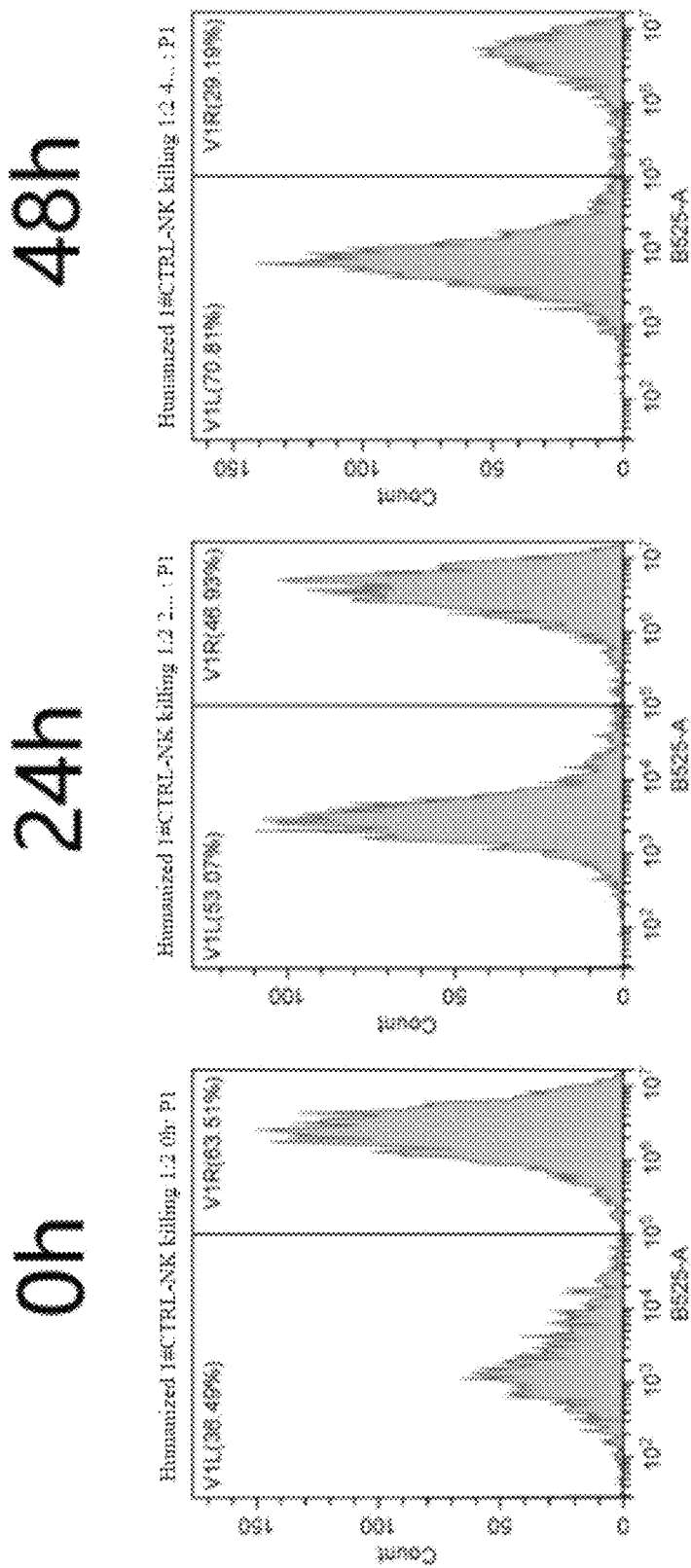
FIG. 3A is a graph showing the killing ability of BCMA-CAR in a negative control group.
Figure 3B:
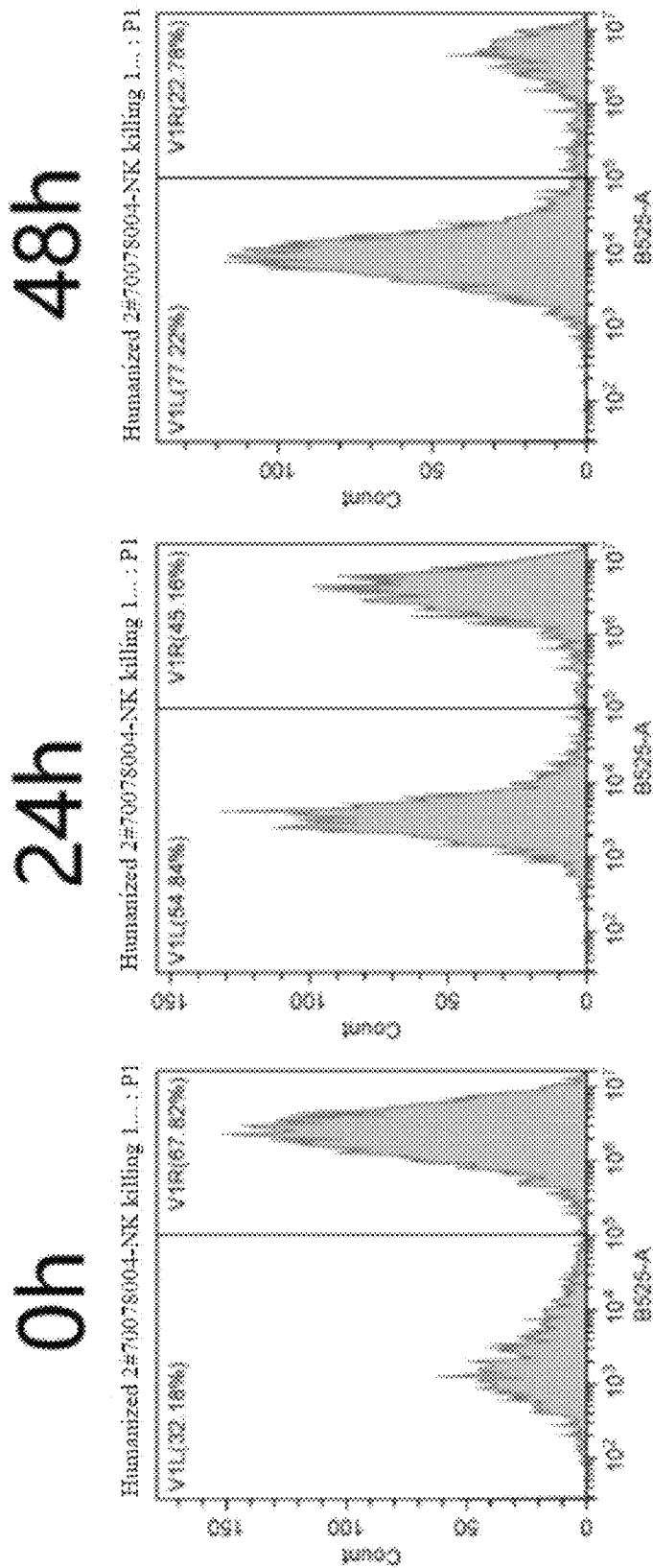
FIG. 3B is a graph showing the killing ability of mouse-derived BCMA-CAR.
Figure 3C:
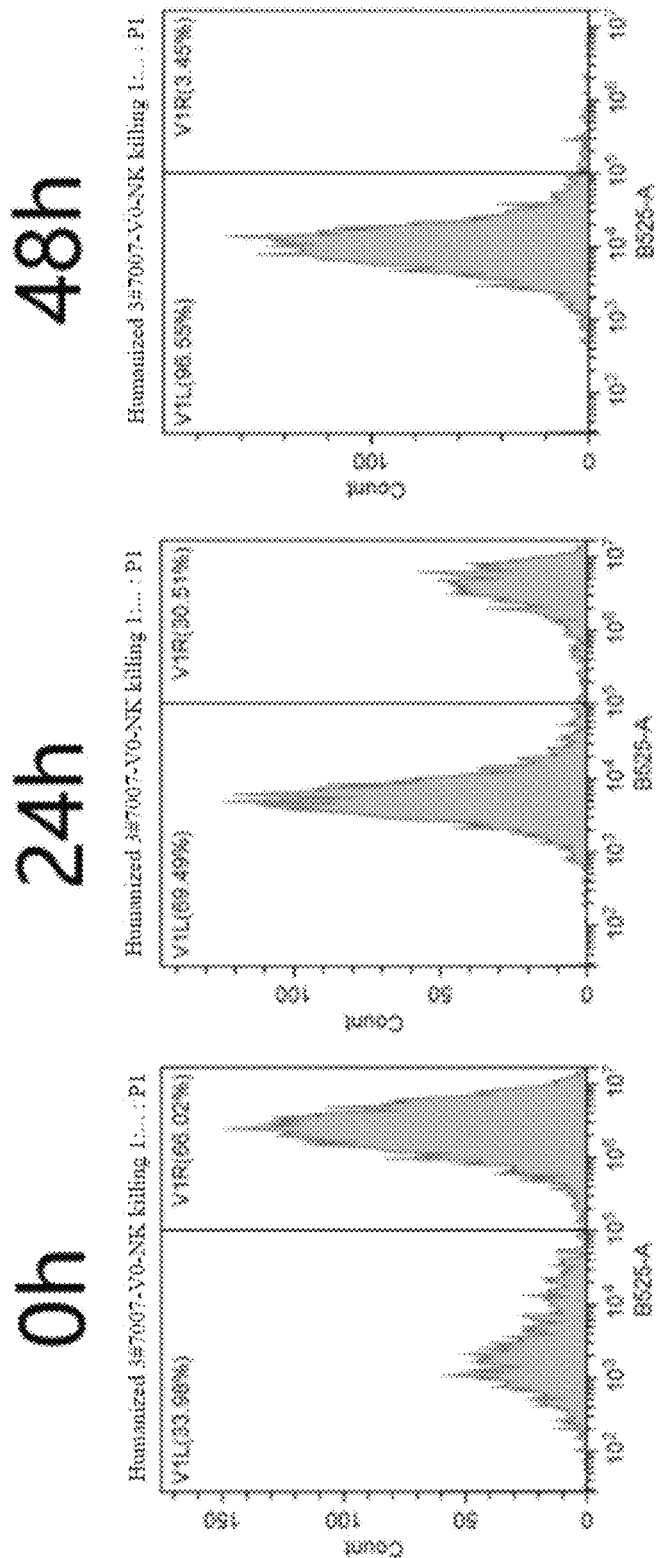
FIG. 3C is a graph showing the killing ability of humanized BCMA-CAR-V0.
Figure 3D:
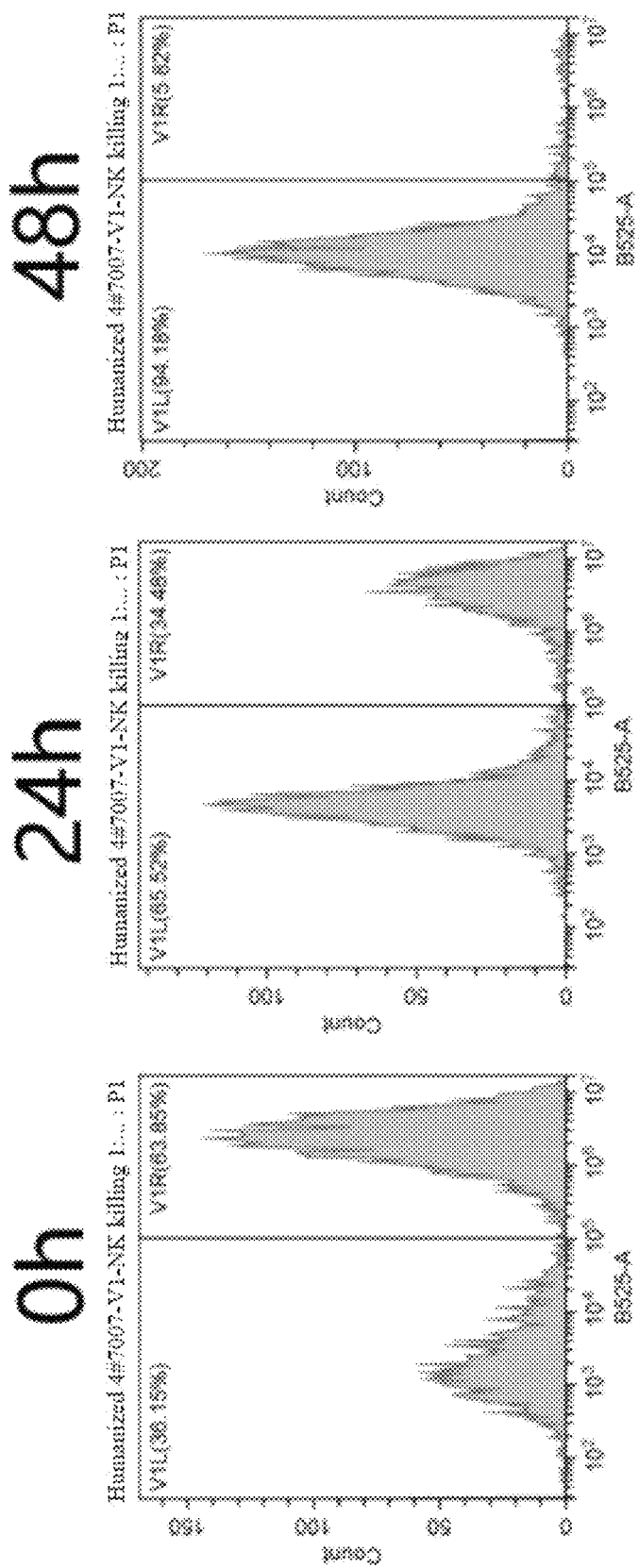
FIG. 3D is a graph showing the killing ability of humanized BCMA-CAR-V1.
Figure 3E:
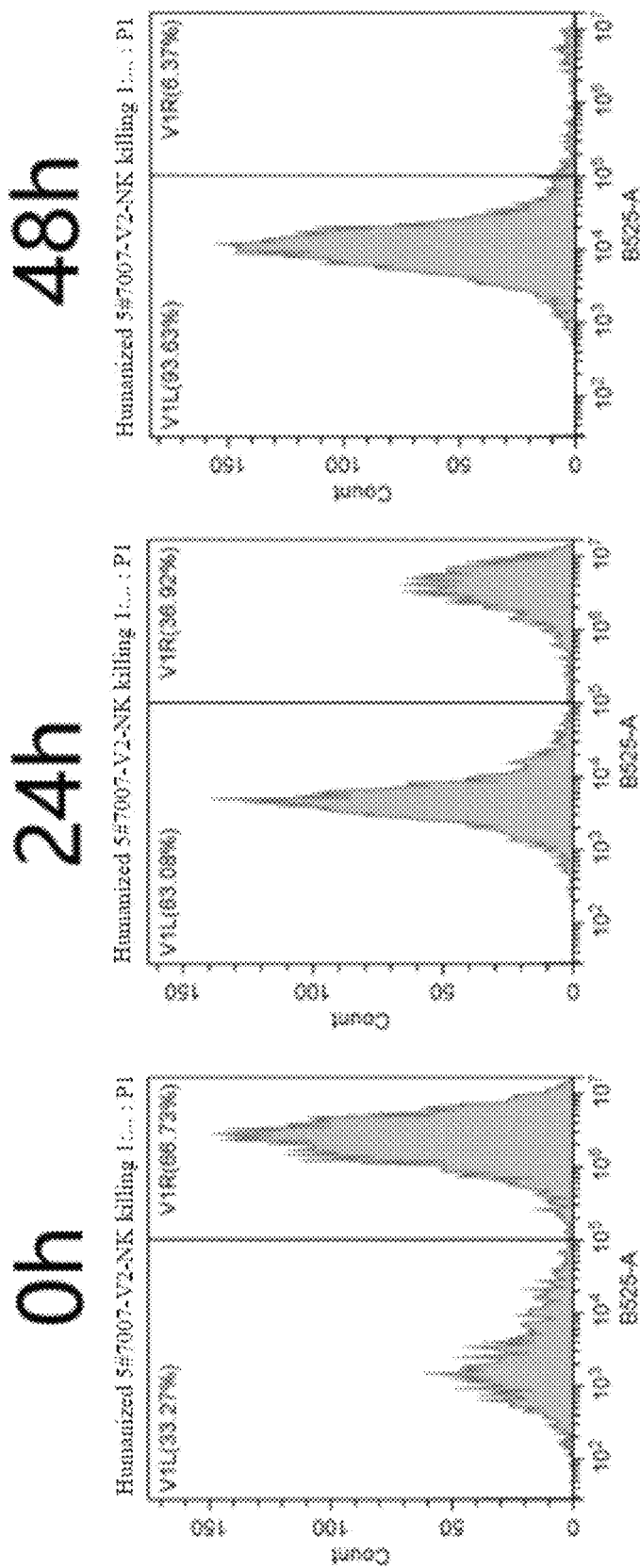
FIG. 3E is a graph showing the killing ability of humanized BCMA-CAR-V2.
Figure 3F:
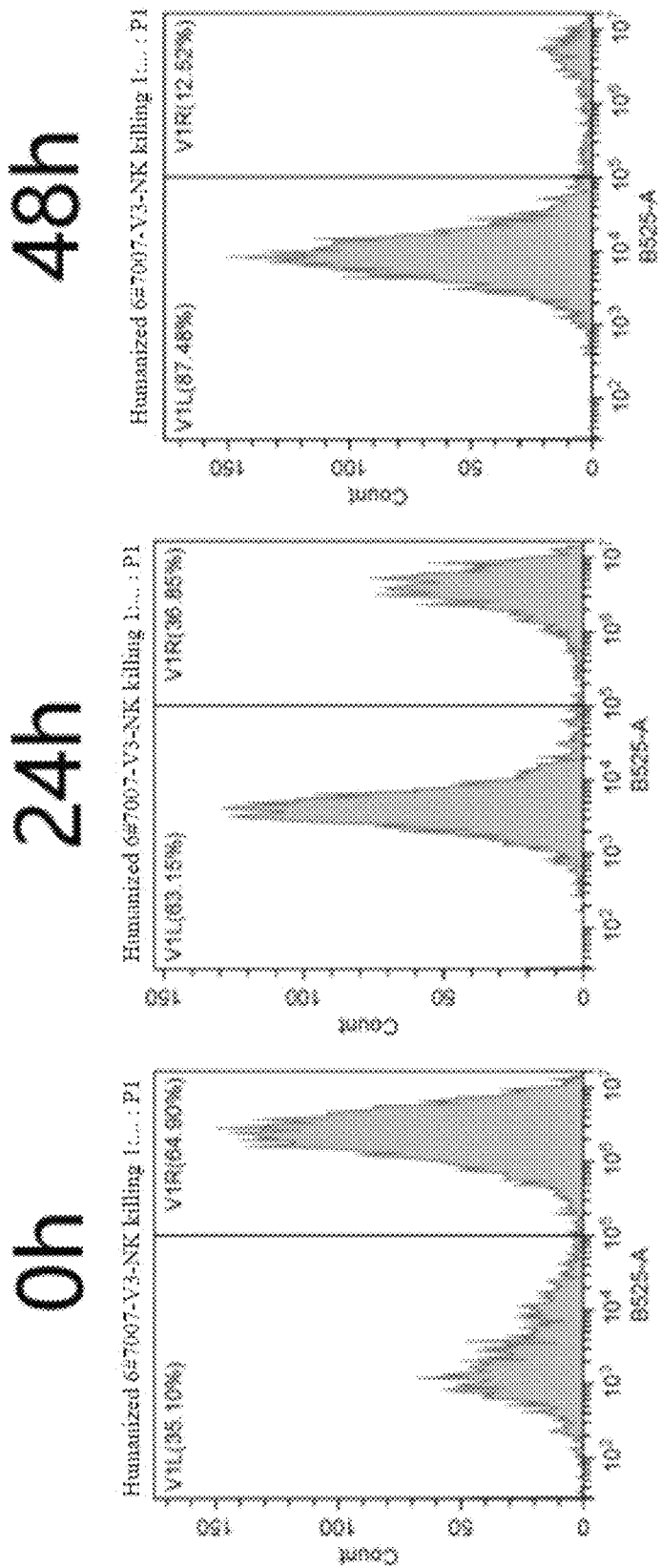
FIG. 3F is a graph showing the killing ability of humanized BCMA-CAR-V3.
Figure 3G:
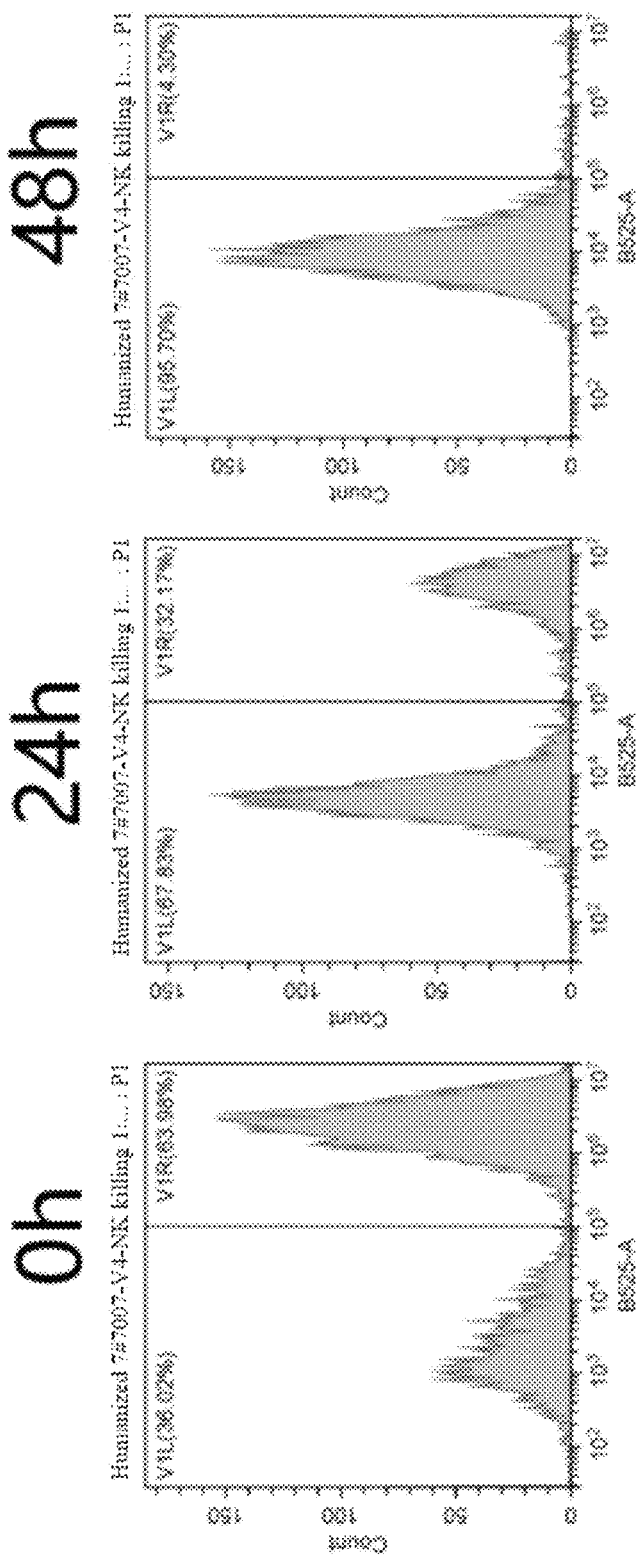
FIG. 3G is a graph showing the killing ability of humanized BCMA-CAR-V4.
Figure 3H:
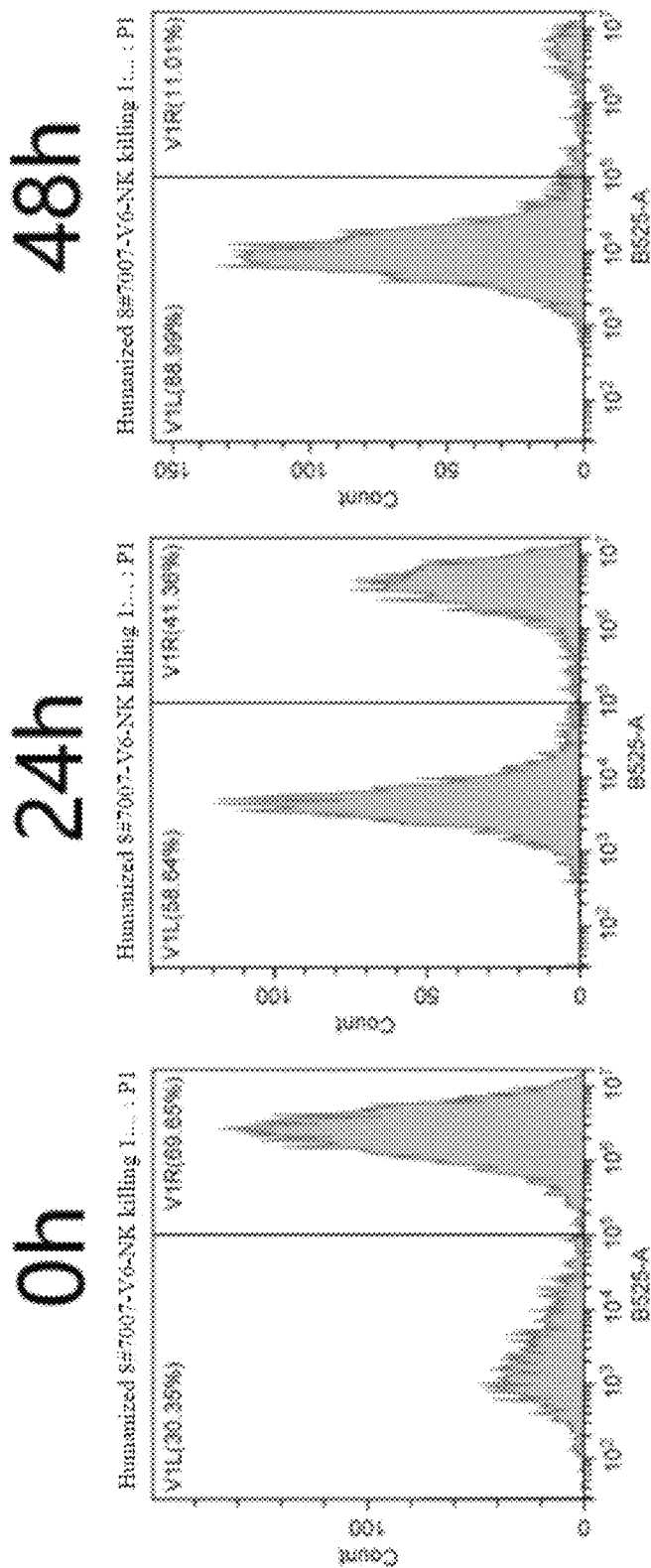
FIG. 3H is a graph showing the killing ability of humanized BCMA-CAR-V6.
Figure 3I:
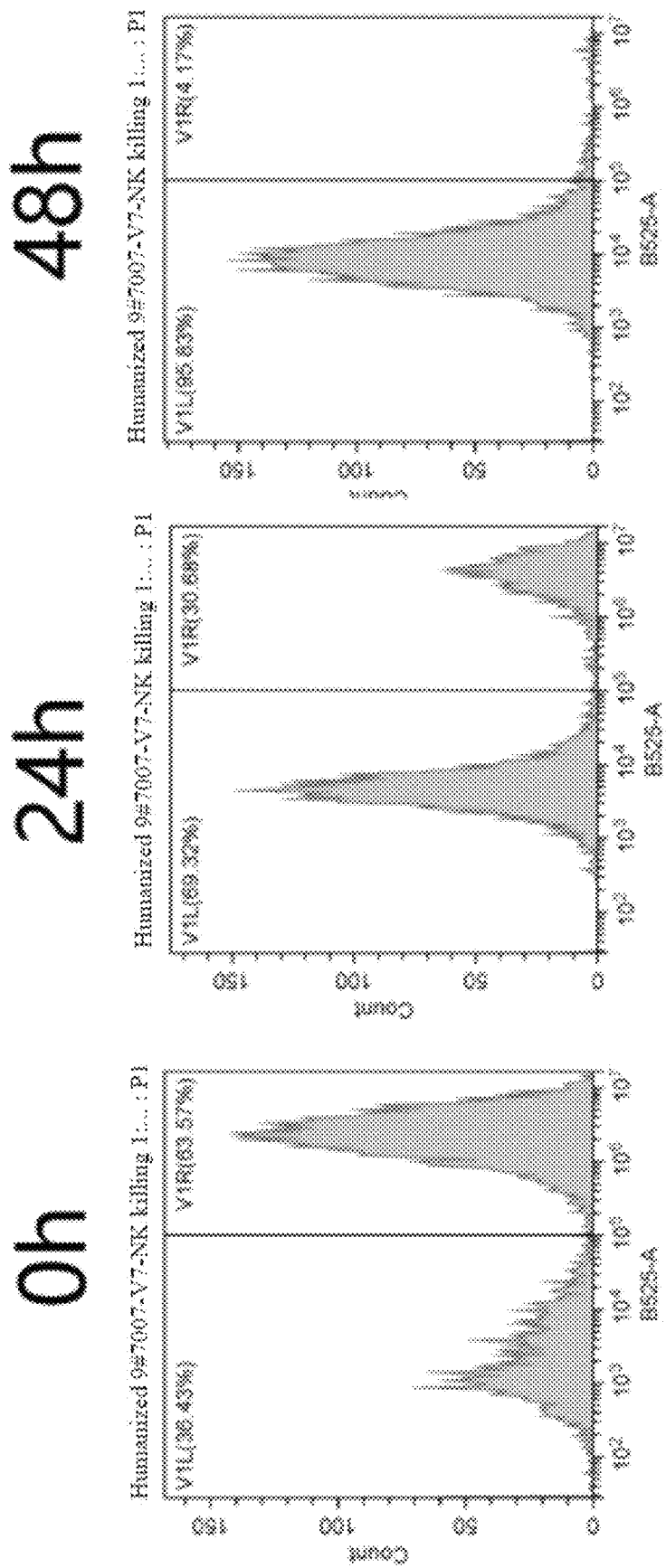
FIG. 3I is a graph showing the killing ability of humanized BCMA-CAR-V7.
Figure 3J:
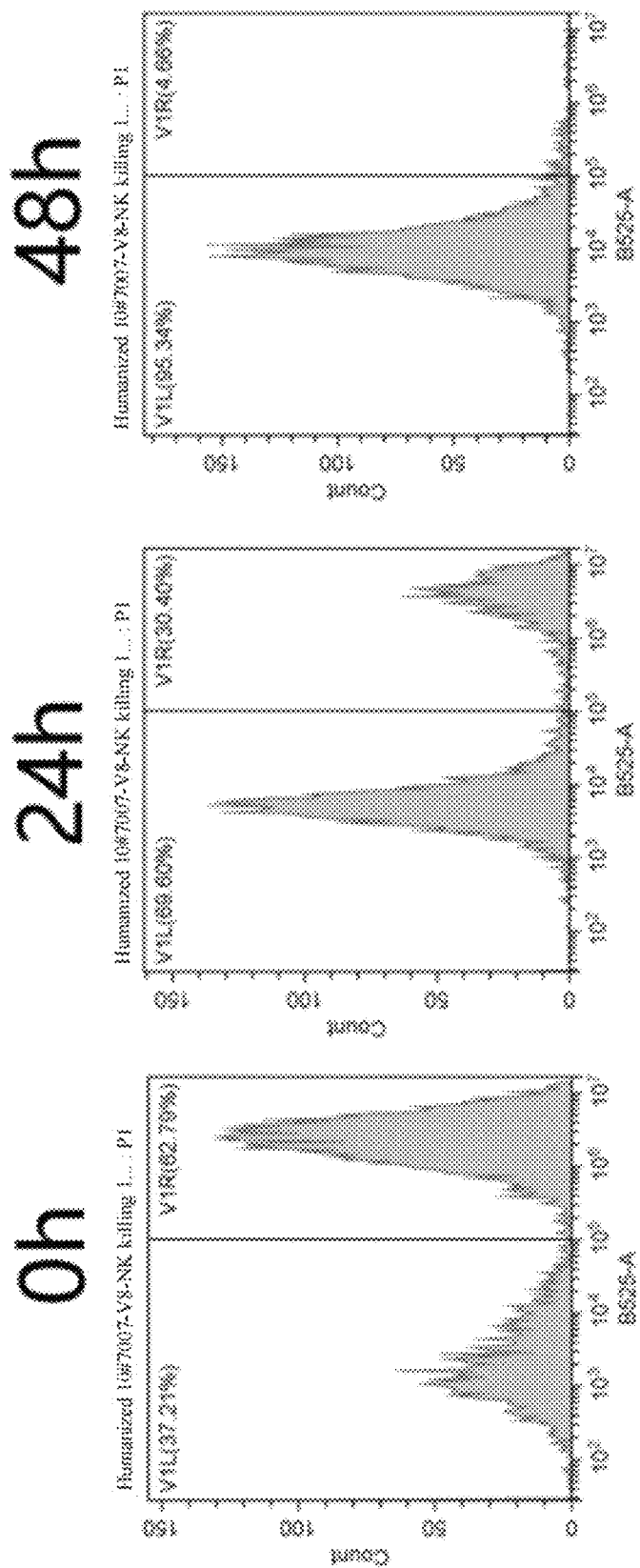
FIG. 3J is a graph showing the killing ability of humanized BCMA-CAR-V8.

The results prove that the mouse-derived BCMA antibody provided in the present disclosure has good affinity to H929 cells. The positive rate of PE-fluorescence labeled H929 cells is shown in Table 1, and the detection results are shown in FIG. 1.

TABLE 1

| PE positive rate statistics | |
| --- | --- |
| Group | Allophycocyanin (APC) fluorescent positive rate |
| H929 blank | 0.05% |
| H929 + PE | 0.01% |
| Negative control | 0.05% |
| Positive control | 98.09% |
| BCMA-scFv candidate | 73.05% |

Embodiment 2, Detection of Transduction Rate of CAR Constructed by Humanized Antibody to Cells Acquisition of Humanized Antibody Mouse-derived antibodies were humanized. Specifically, a sequence of a light chain CDR1 of each of the humanized antibodies was as shown in SEQ ID NO. 1, an amino acid sequence of a light chain CDR2 was as shown in SEQ ID NO. 2, and a light chain CDR3 was as shown in SEQ ID NO. 3 or SEQ ID NO. 4. A sequence of a heavy chain CDR1 of each of the humanized antibodies was as shown in SEQ ID NO. 5, an amino acid sequence of a heavy chain CDR2 was as shown in SEQ ID NO. 6, and a heavy chain CDR3 was as shown in SEQ ID NO. 7 or SEQ ID NO. 8.

In the case that the above CDR (also known as hypervariable region) remains unchanged, different FRs were also tested, proving that the antibodies formed by different FRs were functional in the case that the above CDR remains unchanged. Specifically, a light chain FR1 could be shown as any one of SEQ ID NO. 9-10, a light chain FR2 could be shown as any one of SEQ ID NO. 11-12, a light chain FR3 could be shown as any one of SEQ ID NO. 13-14, and a light chain FR4 could be shown as any one of SEQ ID NO. 15-16. A heavy chain FR1 could be shown as any one of SEQ ID NO. 17-18, a heavy chain FR2 could be shown as any one of SEQ ID NO. 19-21, a heavy chain FR3 could be shown as any one of SEQ ID NO. 22-24, and a heavy chain FR4 could be shown as any one of SEQ ID NO. 25-26.

Humanized antibodies V0, V1, V2, V3, V4, V6, V7, and V8 were further prepared for testing. Specifically, amino acid sequences of the humanized antibodies V0, V1, V2, V3, V4, V6, V7, and V8 were sequentially shown as SEQ ID NO. 28-35, and coding nucleic acid sequences were sequentially shown as SEQ ID NO. 37-44.

Construction of CAR

A CD8 signal peptide (shown as SEQ ID NO. 45) was ligated in front of the above mouse-derived and humanized antibodies, and a CD8 hinge region+a transmembrane domain (shown as SEQ ID NO. 46), a 4-1BB co-stimulatory structural domain (shown as SEQ ID NO. 47), and an intracellular signal transduction structural domain (shown as SEQ ID NO. 48) were ligated after the mouse-derived antibody, and BCMA-CAR-V0/V1/V2/V3/V4/V6/V7/V8 was obtained for transduction.

That is, the function of CAR was verified in the present disclosure through the following structure: CD8 signal peptide-antibody-CD8 hinge region-CD8 transmembrane domain-4-1BB co-stimulatory structural domain-intracellular signal transduction structural domain.

Preparation of CAR-NK Cells

A third-generation lentiviral packaging system and a four-plasmid system were employed to package three plasmids: pRSV-Rev, pMDLg/pRRE, and pMD2.G, and shuttle pLVX-puro, and HEK293T cells served as virus production cells, at a mixing ratio of pLenti-puro:pRSV-Rev:pMDLg/pRRE:pMD2.G of 2:1:1:1. A lipidosome mirusTransIT-293 (mir2700) acted as a transfection reagent, with a lipidosome-to-DNA ratio of 3:1. After the transfection, supernatant was collected in three days and centrifuged at a high speed of 40000 g for 6 h.

Viruses at an infection concentration of 10 MOI were directly added to a culture medium of NK cells, and at the same time, 0.8 μg/mL of polybrene was added, followed by incubating for 6 h. An NK medium containing viruses was removed, and a fresh NK medium was added for continuous culture. The CAR positive rate was determined by a flow cytometry at different time points.

Results Analysis

The flow cytometry results of humanized BCMA-CAR expression and stability are shown in Table 2, showing that BCMA-CAR-V0/V1/V2/V3/V4/V6/V7/V8 can transduce NK cells well, and the transduction rate of each group can reach between 70%-90% on Day 2.

From Day 4, the BCMA-CAR expression tends to be stable, and the difference in the stability of expression between groups is shown. The BCMA-CAR expression in the mouse-derived group decreases significantly to 30.5%, with inconspicuous clustering. The stability of expression in each humanized group is different. In the four groups of BCMA-CAR-V0/V1/V2/V6, the stability of expression is better, with conspicuous cell clustering, and the proportions of CAR-NK cells are 19.99%, 14.2%, 15.45% and 17.01%, respectively. The histogram shows an obvious BCMA-CAR-NK cell cluster forming on the right side.

On Day 6-Day 8, the BCMA-CAR expression in the mouse-derived group further decreases to 11.29%, with inconspicuous CAR-NK cell clustering, while the stability of expression in the five humanized groups of BCMA-CAR-V0/V1/V2/V4/V6 is better, with conspicuous cell clustering and CAR-NK cells accounting for 18.35%, 12.83%, 14.5%, 14.3%, and 14.47%, respectively.

Compared with mouse-derived BCMA-CAR, the humanized BCMA-CAR has a more stable and uniform expression on an NK cell membrane, and can form a clearer group of NK cell clusters (V0/V1/V2/V4/V6) expressing CAR. In the histogram, BCMA-CAR-NK cells are shown as a small cell peak on the right side, and the more conspicuous of this peak is, the more uniform and stable of the CAR expression is.

TABLE 2

Flow cytometry results of BCMA-CAR expression and stability

| Numerical order | Group | Day 2 | Day 4 | Day 6 | Day 8 |
|---|---|---|---|---|---|
| 1 | Negative control | 0.47% | 0.31% | 0.27% | 0.38% |
| 2 | Mouse-derived BCMA-CAR | 81.93% | 30.50% | 11.29% | 10.08% |
| 3 | Humanized BCMA-CAR-V0 | 89.83% | 19.99% | 18.35% | 16.38% |
| 4 | Humanized BCMA-CAR-V1 | 72.01% | 14.20% | 12.83% | 10.68% |
| 5 | Humanized BCMA-CAR-V2 | 87.10% | 15.45% | 14.50% | 12.81% |
| 6 | Humanized BCMA-CAR-V3 | 78.23% | 24.43% | 7.67% | 7.16% |
| 7 | Humanized BCMA-CAR-V4 | 74.15% | 29.51% | 14.30% | 13.19% |
| 8 | Humanized BCMA-CAR-V6 | 75.54% | 17.01% | 14.47% | 13.53% |
| 9 | Humanized BCMA-CAR-V7 | 76.82% | 27.09% | 11.16% | 8.85% |
| 10 | Humanized BCMA-CAR-V8 | 76.30% | 30.95% | 13.87% | 11.89% |

Embodiment 3, Cell Killing Experiment

BCMA-CAR-NK cells in each group were expanded, cultured, and counted.

A target cell line with green fluorescence: H929-GFP cell was cultured, and counted.

The BCMA-CAR-NK cells and the H929-GFP cells were co-cultured at an effector-target ratio of 1:2.

The proportion of H929-GFP cells in a co-culture system was detected by a flow cytometry at different time points (24 h, and 48 h).

Results Analysis

TABLE 3

Detection results of cell killing at effector-target ratio of 1:2

| Numerical order | Group | 0 h | 24 h | 48 h | 24 h killing ratio | 48 h killing ratio |
|---|---|---|---|---|---|---|
| 1 | Negative control without virus | 63.51% | 46.93% | 29.19% | 26.11% | 54.04% |
| 2 | Mouse-derived BCMA-CAR | 67.82% | 45.16% | 22.78% | 33.41% | 66.41% |
| 3 | Humanized BCMA-CAR-V0 | 66.02% | 30.51% | 3.45% | 53.79% | 94.77% |
| 4 | Humanized BCMA-CAR-V1 | 63.85% | 34.48% | 5.82% | 46.00% | 90.88% |
| 5 | Humanized BCMA-CAR-V2 | 66.73% | 36.92% | 6.37% | 44.67% | 90.45% |
| 6 | Humanized BCMA-CAR-V3 | 64.90% | 36.85% | 12.52% | 43.22% | 80.71% |
| 7 | Humanized BCMA-CAR-V4 | 63.98% | 32.17% | 4.30% | 49.72% | 93.28% |
| 8 | Humanized BCMA-CAR-V6 | 69.65% | 41.36% | 11.01% | 40.62% | 84.19% |
| 9 | Humanized BCMA-CAR-V7 | 63.57% | 30.68% | 4.17% | 51.74% | 93.44% |
| 10 | Humanized BCMA-CAR-V8 | 62.79% | 30.40% | 4.66% | 51.58% | 92.58% |

The detection results of cell killing at effector-target ratio of 1:2 are shown in Table 3. At 24 h, compared with the proportion of 45.16% of the H929-GFP cells accounting in the mouse-derived BCMA-CAR-NK group, the H929-GFP cells account less in each humanized BCMA-CAR-NK group. The H929-GFP cells in the four groups of BCMA-CAR-V0/V4/V7/V8 account for 30.5%, 32.17%, 30.68%, 30.4%, and 30.4%, respectively.

At 48 h, compared with the proportion of 22.78% of the H929-GFP cells in the mouse-derived BCMA-CAR-NK group, the proportion of the H929-GFP cells in each humanized BCMA-CAR-NK group is significantly decreased. The H929-GFP cells in the four groups of BCMA-CAR-V0/V4/V7/V8 account for 3.45%, 4.3%, 4.17%, and 4.66%, respectively. The histogram shows that, the lower or even disappearing of the small cell peak on the right side, the higher the killing ability.

Compared with the mouse-derived BCMA-CAR-NK cells, the humanized BCMA-CAR-NK cells have a better killing ability to basically remove the tumor cells at 48 h, and show different killing ability in the presence of different humanized modifications. On the whole, the humanized BCMA-CAR-NK cells have a better killing ability than that of the mouse-derived BCMA-CAR-NK cells.

---

The invention claimed is:

1. An antibody or an antigen binding fragment thereof targeting a B cell maturation antigen (BCMA), the antibody containing a variable light chain and a variable heavy chain, the variable light chain containing a light chain complementarity-determining region (CDR) 1, a light chain CDR2, and a light chain CDR3, the light chain CDR1 having the sequence as shown in SEQ ID NO. 1, the light chain CDR2 having the amino acid sequence as shown in SEQ ID NO. 2, and the light chain CDR3 being as shown in SEQ ID NO. 3 or SEQ ID NO. 4; and the variable heavy chain containing a heavy chain CDR1, a heavy chain CDR2, and a heavy chain CDR3, the heavy chain CDR1 having the sequence as shown in SEQ NO. 5, the heavy chain CDR2 having the amino acid sequence as shown in SEQ ID NO. 6, and the heavy chain CDR3 being as shown in SEQ ID NO. 7 or SEQ ID NO. 8.

2. The antibody or an antigen binding fragment thereof according to claim 1, wherein the antibody is linked as the variable light chain—a connexon—the variable heavy chain.

3. The antibody or an antigen binding fragment thereof according to claim 1, wherein the antibody is humanized.

4. The antibody or an antigen binding fragment thereof according to claim 1, wherein the antibody has the sequence as shown in any one of SEQ ID NO. 28-35.

5. The antibody or an antigen binding fragment thereof according to claim 1, wherein the antibody contains a heavy chain constant region and a light chain constant region.

6. An antibody complex, formed by ligating the antibody or an antigen binding fragment thereof according to claim 1 to a cluster of differentiation (CD) 8 hinge region, a CD8 transmembrane domain, a 4-1BB co-stimulatory structural domain, and an intracellular signal transduction structural domain, the intracellular signal transduction structural domain having the amino acid sequence as shown in SEQ ID NO. 48.

7. The antibody complex according to claim 6, wherein the antibody complex further comprises a signal peptide.

8. The antibody complex according to claim 7, wherein the signal peptide is a CD8 signal peptide.

9. An antibody conjugate, containing the antibody or an antigen binding fragment thereof according to claim 1, and further containing a conjugated portion selected from the following group: a detectable marker, a drug, a toxin, a cytokine or an enzyme.

10. A drug composition for treating BCMA-related diseases, containing the antibody complex according to claim 6 and a diluent, the BCMA-related disease is multiple myeloma (MM), Burkitt's lymphoma, and plasma cell leukemia.

11. A drug composition for treating BCMA-related diseases, containing the antibody complex according to claim 6 and a diluent, the BCMA-related disease is myeloma.

12. A method for detection of BCMA, comprising a step of contacting the antibody or an antigen binding fragment thereof according to claim 1 with a sample, the detection being for non-diagnostic purposes, and detecting binding between a) BCMA in the sample and b) the antibody or antigen-binding fragment thereof, wherein binding indicates the presence of BCMA in the sample.

13. The method according to claim 12, wherein the antibody or an antigen biding fragment thereof is an antibody having a detectable marker.

14. The method according to claim 13, wherein the detectable marker is selected from an enzyme, a fluorescent material, a luminescent material, a radioactive material, a positron emission metal, and a non-radioactive paramagnetic metal ion.

15. The method according to claim 12, wherein the sample comprises a physiological body fluid, the physiological body fluid being selected from blood, a serum, plasma, saliva, an eye secretion, a cerebrospinal fluid, pus, an exudate, breast milk, sweat, a tear, an ear effluent, a sputum, lymph, urine or feces; and/or the sample comprises a tissue, the tissue being from a lung, a spleen or a kidney.

16. The method according to claim 12, wherein the sample to be detected contains B cells.

17. A method of preparing a drug for treating diseases, the disease being multiple myeloma, Burkitt's lymphoma, or plasma cell leukemia, comprising providing the antibody complex according to claim 6, and combining the antibody complex with a pharmaceutically acceptable excipient.

18. A method of preparing a drug for treating diseases, the disease being myeloma comprising providing the antibody complex according to claim 6, and combining the antibody complex with a pharmaceutically acceptable excipient.

* * * * *